(12) United States Patent
Yin et al.

(10) Patent No.: US 11,368,520 B2
(45) Date of Patent: *Jun. 21, 2022

(54) METHOD, APPARATUS, AND SYSTEM FOR EXECUTING DISTRIBUTED TRANSACTION RESOURCES

(71) Applicant: Huawei Cloud Computing Technologies Co., Ltd., Gui'an New District (CN)

(72) Inventors: Jiaxin Yin, Nanjing (CN); Ying Gao, Shenzhen (CN); Yongjing Zhang, Nanjing (CN)

(73) Assignee: Huawei Cloud Computing Technologies Co., Ltd., Gui'an New District (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/991,582

(22) Filed: Aug. 12, 2020

(65) Prior Publication Data
US 2020/0374338 A1    Nov. 26, 2020

Related U.S. Application Data

(63) Continuation of application No. 16/397,470, filed on Apr. 29, 2019, now Pat. No. 10,771,535, which is a
(Continued)

(30) Foreign Application Priority Data

Nov. 12, 2014 (CN) .......................... 201410637221.X

(51) Int. Cl.
*H04L 67/10* (2022.01)
*H04L 65/40* (2022.01)
(Continued)

(52) U.S. Cl.
CPC .............. *H04L 67/10* (2013.01); *H04L 29/08* (2013.01); *H04W 4/70* (2018.02); *H04L 69/329* (2013.01)

(58) Field of Classification Search
None
See application file for complete search history.

(56) References Cited

U.S. PATENT DOCUMENTS 6,701,345 B1 *   3/2004   Carley .................. G06F 16/252
                                                      709/205
9,451,387 B2     9/2016   Shu et al.
(Continued)

FOREIGN PATENT DOCUMENTS

CN        1449157 A      10/2003
CN      101853186 A      10/2010
(Continued)

OTHER PUBLICATIONS

Bose, Sumit Kumar et al. "CloudSpider: Combining Replication with Scheduling for Optimizing Live Migration of Virtual Machines Across Wide Area Networks," 2011 11th IEEE/ACM International Symposium on Cluster, Cloud and Grid Computing, IEEE Computer Science, May 2011, 10 pages.

*Primary Examiner* — Davoud A Zand
(74) *Attorney, Agent, or Firm* — Slater Matsil, LLP

(57) ABSTRACT

The method includes: receiving, by a first managed object device, a first transaction resource creation request that is sent by an application server and includes an identifier of a first to-be-operated resource, a first execution time, and a first to-be-executed operation; receiving, by a second managed object device, a second transaction resource creation request that is sent by the application server and includes an identifier of a second to-be-operated resource, a second execution time, and a second to-be-executed operation; successfully creating, by the first managed object device, a
(Continued)

first transaction resource according to the first transaction resource creation request, and successfully creating, by the second managed device, a second transaction resource according to the second transaction resource creation request.

15 Claims, 7 Drawing Sheets

Related U.S. Application Data continuation of application No. 15/594,302, filed on May 12, 2017, now Pat. No. 10,326,828, which is a continuation of application No. PCT/CN2015/080607, filed on Jun. 2, 2015.

(51) Int. Cl.
*H04W 4/70* (2018.01)
*H04L 69/329* (2022.01)

(56) References Cited

U.S. PATENT DOCUMENTS

| | | | |
|---|---|---|---|
| 10,015,684 B2* | 7/2018 | Park | H04L 67/303 |
| 2004/0040025 A1* | 2/2004 | Lehtinen | G06F 9/4881 |
| | | | 718/104 |
| 2005/0117587 A1 | 6/2005 | Kawato | |
| 2008/0013531 A1* | 1/2008 | Elliott | H04L 65/1026 |
| | | | 370/356 |
| 2008/0120129 A1* | 5/2008 | Seubert | G06Q 10/10 |
| | | | 705/35 |
| 2008/0162637 A1* | 7/2008 | Adamczyk | H04L 51/043 |
| | | | 709/204 |
| 2010/0169284 A1 | 7/2010 | Walter et al. | |
| 2012/0266209 A1* | 10/2012 | Gooding | H04L 63/20 |
| | | | 726/1 |
| 2013/0198340 A1 | 8/2013 | Ukkola et al. | |
| 2013/0324174 A1 | 12/2013 | Mueck | |
| 2014/0089666 A1 | 3/2014 | Kim et al. | |
| 2014/0112301 A1 | 4/2014 | Shu et al. | |
| 2014/0126581 A1 | 5/2014 | Wang et al. | |
| 2015/0029894 A1 | 1/2015 | Lu et al. | |
| 2016/0302085 A1 | 10/2016 | Park et al. | |
| 2016/0366028 A1 | 12/2016 | Yin | |
| 2019/0124573 A1 | 4/2019 | Yin et al. | |
| 2019/0260822 A1 | 8/2019 | Yin et al. | |

FOREIGN PATENT DOCUMENTS

| | | |
|---|---|---|
| CN | 102056312 A | 5/2011 |
| CN | 102629897 A | 8/2012 |
| CN | 102883404 A | 1/2013 |
| CN | 103458515 A | 12/2013 |
| CN | 103491622 A | 1/2014 |
| CN | 103500180 A | 1/2014 |
| CN | 103947157 A | 7/2014 |
| JP | H096695 A | 1/1997 |
| JP | 2005165568 A | 6/2005 |
| JP | 2011108208 A | 6/2011 |

\* cited by examiner

```
┌─────────────────────────────────────────────────────────────┐
│ The first managed object device receives a third transaction resource │
│ creation request sent by the application server for a second transaction, │
│ where the third transaction resource creation request includes the │           S201
│ identifier of the first to-be-operated resource, a third execution time, │
│ and a third to-be-executed operation │
└─────────────────────────────────────────────────────────────┘
                                    │
                                    ▼
┌─────────────────────────────────────────────────────────────┐
│ The second managed object device receives a fourth transaction │
│ resource creation request sent by the application server for the second │
│ transaction, where the fourth transaction resource creation request │
│ includes the identifier of the second to-be-operated resource, a fourth │           S202
│ execution time, and a fourth to-be-executed operation, and the third │
│ execution time and the fourth execution time are the same │
└─────────────────────────────────────────────────────────────┘
                                    │
                                    ▼
┌─────────────────────────────────────────────────────────────┐
│ The first managed object device determines that a third transaction │
│ resource of the second transaction fails to be created according to the │
│ third transaction resource creation request, and sends a response │           S203
│ indicative of unsuccessful creation of the third transaction resource of │
│ the second transaction to the application server │
└─────────────────────────────────────────────────────────────┘
                                    │
                                    ▼
┌─────────────────────────────────────────────────────────────┐
│ The second managed device successfully creates a fourth transaction │
│ resource of the second transaction according to the fourth transaction │
│ resource creation request, and sends a response indicative of successful │
│ creation of the fourth transaction resource of the second transaction to │           S204
│ the application server, where the response indicative of successful │
│ creation of the fourth transaction resource carries an identifier of the │
│ fourth transaction resource │
└─────────────────────────────────────────────────────────────┘
                                    │
                                    ▼
┌─────────────────────────────────────────────────────────────┐
│ The second managed object device that sends the response indicative of │
│ successful creation of the fourth transaction resource to the application │
│ server receives a fourth transaction resource processing request sent by │
│ the application server for the second transaction, where the fourth │           S205
│ transaction resource processing request for the second transaction │
│ carries the identifier of the fourth transaction resource │
└─────────────────────────────────────────────────────────────┘
                                    │
                                    ▼
┌─────────────────────────────────────────────────────────────┐
│ The second managed object device that sends the response indicative of │
│ successful creation of the fourth transaction resource to the application │
│ server processes the created fourth transaction resource according to │           S206
│ the identifier of the fourth transaction resource │
└─────────────────────────────────────────────────────────────┘
```

FIG. 3

The first managed object device determines that a first transaction resource queue exists on the first managed object device, where the first transaction resource queue includes at least one transaction resource — S301

The first managed object device determines, according to the third execution time and a state of the first to-be-operated resource, that the third transaction resource does not meet a preset resource creation condition — S302

FIG. 4

The second managed object device determines that a second transaction resource queue exists on the second managed object device, where the second transaction resource queue includes at least one transaction resource — S401

The second managed object device determines, according to the fourth execution time and a state of the second to-be-operated resource of the second managed object device, that the fourth transaction resource meets the preset resource creation condition, and creates the fourth transaction resource — S402

FIG. 5

The second managed object device deletes the fourth transaction resource on the second managed object device according to the identifier of the fourth transaction resource — S501

The second managed object device sends a deletion response to the application server — S502

FIG. 6

```
┌─────────────────────────────────────────────────────────┐
│ The application server sends a third transaction resource creation │
│ request for a second transaction to the first managed object device, │
│ where the third transaction resource creation request includes the  │    S801
│ identifier of the first to-be-operated resource, a third execution time, │
│         and a third to-be-executed operation            │
└─────────────────────────────────────────────────────────┘
                            │
                            ▼
┌─────────────────────────────────────────────────────────┐
│ The application server sends a fourth transaction resource creation │
│   request for the second transaction to the second managed object   │
│ device, where the fourth transaction resource creation request includes │
│  the identifier of the first to-be-operated resource, a fourth execution │  S802
│  time, and a fourth to-be-executed operation, and the third execution │
│         time and the fourth execution time are the same          │
└─────────────────────────────────────────────────────────┘
                            │
                            ▼
┌─────────────────────────────────────────────────────────┐
│ The application server receives, within a preset time, a response sent │
│ by the first managed object device indicative of unsuccessful creation │
│ of a third transaction resource of the second transaction, and receives, │
│  within the preset time, a response sent by the second managed object   │
│ device indicative of successful creation of a fourth transaction resource │  S803
│ of the second transaction, where the response indicative of successful │
│  creation of the fourth transaction resource carries an identifier of the │
│                fourth transaction resource               │
└─────────────────────────────────────────────────────────┘
                            │
                            ▼
┌─────────────────────────────────────────────────────────┐
│   The application server sends, based on the response indicative of   │
│  unsuccessful creation of the third transaction resource of the second │
│   transaction and the response indicative of successful creation of the │
│     fourth transaction resource of the second transaction, a fourth    │
│  transaction resource processing request for the second transaction to  │  S804
│  the second managed object device that sends the response indicative   │
│   of successful creation of the fourth transaction resource, where the │
│      fourth transaction resource processing request for the second     │
│  transaction carries the identifier of the fourth transaction resource │
└─────────────────────────────────────────────────────────┘
```

FIG. 9

METHOD, APPARATUS, AND SYSTEM FOR EXECUTING DISTRIBUTED TRANSACTION RESOURCES

CROSS-REFERENCE TO RELATED APPLICATIONS

This application is a continuation of U.S. patent application Ser. No. 16/397,470, filed on Apr. 29, 2019, which is a continuation of U.S. patent application Ser. No. 15/594,302, filed on May 12, 2017, now U.S. Pat. No. 10,326,828. The U.S. patent application Ser. No. 15/594,302 is a continuation of International Application No. PCT/CN2015/080607, filed on Jun. 2, 2015, which claims priority to Chinese Patent Application No. 201410637221.X, filed on Nov. 12, 2014. All of the aforementioned patent applications are hereby incorporated by reference in their entireties.

TECHNICAL FIELD

Embodiments of the present invention relate to computer technologies, and in particular, to a method, an apparatus, and a system for executing distributed transaction resources.

BACKGROUND

Currently, a machine to machine (M2M for short hereinafter) communications, namely, an Internet of Things technology, is extensively applied in more industries and fields, such as intelligent traffic, agricultural irrigation, and smart home industries. To meet application service requirements in different industries, an M2M system operator develops a unified M2M platform to implement some common capabilities, for example, data access and storage, data sharing and transmission, and group communication. The M2M platform may be accessed by different types of managed object devices (for example, sensors), and may provide a northbound application access interface, allowing application servers of different industries to invoke, by using the access interface, the common capabilities provided by the M2M platform.

For distributed transactions in an M2M system using a RESTful architecture, a transaction means that a task or operation needs to be completed by using multiple requests between an application server and managed object devices. The transaction is required to have atomicity (herein the atomicity means that the transaction is an indivisible work unit, and all operations included in the transaction should be executed to ensure execution integrity). In addition, in some scenarios of the M2M system in which a distributed transaction is committed, transaction resources on multiple servers require simultaneous execution. For example, in a scenario of intelligent irrigation including a water source and a large quantity of valves (these valves are managed object devices), which piece of farmland is irrigated and how much water is supplied are determined by opening/closing of a valve and an opening percentage. Specifically, a piece of land is divided into multiple plots; soil sensors that are deployed on the land and distributed in different plots collect degrees of water shortage in soil, and report collected data of water shortage of the soil to an M2M platform by using gateways deployed in different plots. By reading the data of the sensors on the M2M platform, an application server determines whether soil in each plot is currently short of water, and implements land irrigation by controlling opening/closing of a valve. Therefore, irrigation on one piece of land needs to be implemented by adjusting multiple valves, for example, opening a canal head valve, a submain pipe valve, a branch canal valve, and a branch pipe valve. These valves need to be opened simultaneously. Otherwise, if the canal head valve and the submain pipe valve are opened, but the branch canal valve is not opened, a branch canal is caused to overflow. Alternatively, at some thin pipes, an asynchronous adjustment of valves may cause abnormal pressure in the thin pipes, and cause joints to loosen or cause the pipes to deform, and so on.

The prior art provides a method for executing distributed transaction resources in the RESTful architecture, that is, a try-confirm/cancel (TCC for short hereafter) method. Specifically, an application server sends an update request to multiple managed object devices. Each update request carries an expiry time of the update request. A managed object device determines whether the managed object device meets a condition for executing the update request. If yes, the managed object device returns a success response to the application server, and waits for a commit request that is sent by the application server for the update request. If not, the managed object device returns a failure response to the application server, and the application server enters a rollback phase. After the application server receives a success response returned by each managed object device, the application server sends a commit request to each of the multiple managed object devices, so that the multiple managed object devices execute the update request, that is, complete execution of transaction resources, and enter a final state. If a managed object device fails to receive, before the expiry time arrives, the commit request sent by the application server, the update request previously received is automatically canceled, so that the managed object device returns to an initial state.

However, in the method provided by the prior art, because there is a delay in receiving the commit request by each managed object device, the multiple managed object devices cannot simultaneously execute the transaction resources (that is, cannot simultaneously execute the update request). Consequently, reliability of the distributed system is affected. In addition, in the prior art, at least two requests (the foregoing update request and commit request) are required between a transaction coordinator and a server before a transaction can be completed, and signaling overheads of the transaction are relatively high.

SUMMARY

Embodiments of the present invention provide a method, an apparatus, and a system for executing distributed transaction resources, so as to resolve a technical problem in the prior art that reliability of a distributed system is affected because multiple managed object devices cannot execute a transaction resource update request simultaneously due to a delay in receiving a commit request, and resolve a technical problem in the prior art that signaling overheads are high.

According to a first aspect, an embodiment of the present invention provides a method for executing distributed transaction resources for a machine to machine communications (M2M) system. The method includes receiving, by a first managed object device of the M2M system, a first transaction resource creation request sent by an application server of the M2M system for a first transaction. The first transaction resource creation request includes an identifier of a first to-be-operated resource, a first execution time, and a first to-be-executed operation. A second transaction resource creation request sent by the application server for the first transaction is received by a second managed object device of the M2M system different from the first managed object device. The second transaction resource creation request includes an identifier of a second to-be-operated resource, a second execution time, and a second to-be-executed operation, and the first execution time and the second execution time are the same. The method further includes successfully creating, by the first managed object device, a first transaction resource of the first transaction according to the first transaction resource creation request, and successfully creating, by the second managed object device, a second transaction resource of the first transaction according to the second transaction resource creation request. The first transaction resource includes the first execution time and the first to-be-executed operation. The second transaction resource includes the second execution time and the second to-be-executed operation. The method further includes sending, by the first managed object device, a response indicative of successful creation of the first transaction resource of the first transaction to the application server, and sending, by the second managed object device, a response indicative of successful creation of the second transaction resource of the first transaction to the application server. When the first execution time arrives, respectively executing, by the first managed object device and the second managed device, the operations to be executed by the devices.

With reference to the first aspect, in a first possible implementation manner of the first aspect, the method further includes receiving, by the first managed object device, a third transaction resource creation request sent by the application server for a second transaction, where the third transaction resource creation request includes the identifier of the first to-be-operated resource, a third execution time, and a third to-be-executed operation. A fourth transaction resource creation request sent by the application server for the second transaction is received by the second managed object device. The fourth transaction resource creation request includes the identifier of the second to-be-operated resource, a fourth execution time, and a fourth to-be-executed operation, and the third execution time and the fourth execution time are the same. Upon determining that a third transaction resource of the second transaction fails to be created according to the third transaction resource creation request, sending a response indicative of unsuccessful creation of the third transaction resource of the second transaction to the application server; and successfully creating, by the second managed device, a fourth transaction resource of the second transaction according to the fourth transaction resource creation request, and sending a response indicative of successful creation of the fourth transaction resource of the second transaction to the application server, where the response indicative of successful creation of the fourth transaction resource carries an identifier of the fourth transaction resource. The method further includes receiving, by the second managed object device that sends the response indicative of successful creation of the fourth transaction resource to the application server, a processing request sent by the application server for the fourth transaction resource of the second transaction, where the processing request for the fourth transaction resource of the second transaction carries the identifier of the fourth transaction resource. The method further includes processing, by the second managed object device that sends the response indicative of successful creation of the fourth transaction resource to the application server, the created fourth transaction resource according to the identifier of the fourth transaction resource.

With reference to the first possible implementation manner of the first aspect, in a second possible implementation manner of the first aspect, the determining, by the first managed object device, that a third transaction resource of the second transaction fails to be created according to the third transaction resource creation request includes determining, by the first managed object device, that a first transaction resource queue exists on the first managed object device, where the first transaction resource queue includes at least one transaction resource. The method further includes determining, by the first managed object device according to the third execution time and a state of the first to-be-operated resource of the first managed object device, that the third transaction resource does not meet a preset resource creation condition. The method further includes determining, by the first managed object device according to the preset resource creation condition, to update the third execution time to a time later than an execution time of a transaction resource in the first transaction resource queue; and sending, by the first managed object device, a second failure response carrying the updated third execution time to the application server.

With reference to the first possible implementation manner of the first aspect or the second possible implementation manner of the first aspect, in a third possible implementation manner of the first aspect, the successfully creating, by the second managed object device, a fourth transaction resource of the second transaction according to the fourth transaction resource creation request includes determining, by the second managed object device, that a second transaction resource queue exists on the second managed object device, where the second transaction resource queue includes at least one transaction resource. The method further includes determining, by the second managed object device according to the fourth execution time and a state of the second to-be-operated resource of the second managed object device, that the fourth transaction resource meets the preset resource creation condition, and creating the fourth transaction resource.

With reference to any one of the first possible implementation manner of the first aspect to the third possible implementation manner of the first aspect, in a fourth possible implementation manner of the first aspect, the processing request for the fourth transaction resource of the second transaction is an update request that carries the identifier of the fourth transaction resource and the updated third execution time; and the processing, by the second managed object device that sends the response indicative of successful creation of the fourth transaction resource to the application server, the created fourth transaction resource according to the identifier of the fourth transaction resource specifically include successfully updating, by the second managed object device, the fourth transaction resource according to the updated third execution time, and after the update succeeds, returning an update success response message to the application server; or in case failing to update the fourth transaction resource according to the updated third execution time, and returning an update failure response message to the application server.

With reference to the fourth possible implementation manner of the first aspect, in a fifth possible implementation manner of the first aspect, the successfully updating, by the second managed object device, the fourth transaction resource according to the updated third execution time includes deleting, by the second managed object device, the fourth transaction resource on the second managed object device according to the identifier of the fourth transaction resource; using, by the second managed object device, the updated third execution time as an execution time of a new fourth transaction resource; determining, by the second managed object device according to the execution time of the new fourth transaction resource and the state of the second to-be-operated resource of the second managed object device, that the new fourth transaction resource meets the preset resource creation condition; and creating, by the second managed object device, the new fourth transaction resource according to the updated third execution time.

With reference to any one of the first possible implementation manner of the first aspect to the third possible implementation manner of the first aspect, in a sixth possible implementation manner of the first aspect, the processing request for the fourth transaction resource of the second transaction is a deletion request that carries the identifier of the fourth transaction resource; and the processing, by the second managed object device that sends the response indicative of successful creation of the fourth transaction resource to the application server, the created fourth transaction resource according to the identifier of the fourth transaction resource specifically includes: deleting, by the second managed object device, the fourth transaction resource on the second managed object device according to the identifier of the fourth transaction resource.

With reference to the sixth possible implementation manner of the first aspect, in a seventh possible implementation manner of the first aspect, one transaction resource in the second transaction resource queue is in a reserved state, and after the deleting, by the second managed object device, the fourth transaction resource on the second managed object device according to the identifier of the fourth transaction resource, the method further includes determining, by the second managed object device, according to the state of the second to-be-operated resource after a transaction resource at a first position in the second transaction resource queue is executed, whether a transaction resource at the second position can be executed successfully, where the first position is a position previous to the fourth transaction resource in the second transaction resource queue, and the second position is a position next to the fourth transaction resource in the second transaction resource queue. If the transaction resource at the second position is executed successfully, sending, by the second managed object device, a first deletion response to the application server, and after the transaction resource at the first position is executed, updating a state of the transaction resource at the second position to the reserved state. Alternatively, if the transaction resource at the second position fails to be executed, deleting, by the second managed object device, the transaction resource at the second position.

With reference to the sixth possible implementation manner of the first aspect, in an eighth possible implementation manner of the first aspect, at least two transaction resources in the second transaction resource queue are in a reserved state, and after the deleting, by the second managed object device, the fourth transaction resource on the second managed object device according to the identifier of the fourth transaction resource, the method further includes: determining, by the second managed object device, whether a transaction resource in a semi-reserved state in the second transaction resource queue meets a preset deletion condition; and if yes, deleting, by the second managed object device, the transaction resource in the semi-reserved state, and sending a second deletion response to the application server; or if not, determining, by the second managed object device, according to the state of the second to-be-operated resource after any transaction resource previous to the transaction resource in the semi-reserved state is executed, that the transaction resource in the semi-reserved state can be executed successfully, and updating, by the second managed object device, the transaction resource in the semi-reserved state to the reserved state.

According to a second aspect, an embodiment of the present invention describes a method for executing distributed transaction resources for a machine to machine communications (M2M) system. The method includes sending, by an application server of the M2M system, a first transaction resource creation request for a first transaction to a first managed object device of the M2M system. The first transaction resource creation request includes an identifier of a first to-be-operated resource, a first execution time, and a first to-be-executed operation. The method further includes sending, by the application server, a second transaction resource creation request for the first transaction to a second managed object device of the M2M system. The second transaction resource creation request includes an identifier of a second to-be-operated resource, a second execution time, and a second to-be-executed operation, and the first execution time and the second execution time are the same. The method further includes receiving, by the application server, within a preset time, a response that is sent by the second managed object device and that is indicative of successful creation of a second transaction resource of the first transaction, and receiving, within the preset time, a response that is sent by the first managed object device and that is indicative of successful creation of a first transaction resource of the first transaction.

With reference to the second aspect, in a first possible implementation manner of the second aspect, the method further includes sending, by the application server, a third transaction resource creation request for a second transaction to the first managed object device, where the third transaction resource creation request includes the identifier of the first to-be-operated resource, a third execution time, and a third to-be-executed operation; sending, by the application server, a fourth transaction resource creation request for the second transaction to the second managed object device, where the fourth transaction resource creation request includes the identifier of the second to-be-operated resource, a fourth execution time, and a fourth to-be-executed operation, and the third execution time and the fourth execution time are the same; receiving, by the application server, within a preset time, a response that is sent by the first managed object device and that is indicative of unsuccessful creation of a third transaction resource of the second transaction, and receiving, within the preset time, a response that is sent by the second managed object device and that is indicative of successful creation of a fourth transaction resource of the second transaction, where the response indicative of successful creation of the fourth transaction resource carries an identifier of the fourth transaction resource; and sending, by the application server, based on the response indicative of unsuccessful creation of the third transaction resource of the second transaction and the response indicative of successful creation of the fourth transaction resource of the second transaction, a processing request for the fourth transaction resource of the second transaction to the second managed object device that sends the response indicative of successful creation of the fourth transaction resource, where the processing request for the fourth transaction resource of the second transaction carries the identifier of the fourth transaction resource.

With reference to the first possible implementation manner of the second aspect, in a second possible implementation manner of the second aspect, the sending, by the application server, based on the response indicative of unsuccessful creation of the third transaction resource of the second transaction and the response indicative of successful creation of the fourth transaction resource of the second transaction, a processing request for the fourth transaction resource of the second transaction to the second managed object device that sends the response indicative of successful creation of the fourth transaction resource includes: determining, by the application server, that the response indicative of unsuccessful creation of the third transaction resource of the second transaction is a first failure response that does not carry an updated third execution time, and sending a deletion request carrying the identifier of the fourth transaction resource to the second managed object device that sends the response indicative of successful creation of the fourth transaction resource; or determining, by the application server, that the response indicative of unsuccessful creation of the third transaction resource of the second transaction is a second failure response carrying the updated third execution time, and sending an update request carrying the updated third execution time and the identifier of the fourth transaction resource to the second managed object device that sends the response indicative of successful creation of the fourth transaction resource; and the method further includes: sending, by the application server, a third transaction resource creation request carrying the updated third execution time to the first managed device.

According to a third aspect, an embodiment of the present invention provides an application server, applied to a machine to machine communications M2M system, where the M2M system includes at least two managed object devices and the application server, a first managed object device is any one of the at least two managed object devices, and the second managed object is any managed object device in the at least two managed object devices except the first managed object device; and the application server includes: a sending module, configured to send a first transaction resource creation request for a first transaction to the first managed object device, where the first transaction resource creation request includes an identifier of a first to-be-operated resource, a first execution time, and a first to-be-executed operation; and further configured to send a second transaction resource creation request for the first transaction to the second managed object device, where the second transaction resource creation request includes the identifier of the first to-be-operated resource, a second execution time, and a second to-be-executed operation, and the first execution time and the second execution time are the same; and a receiving module, configured to receive, within a preset time, a response that is sent by the second managed object device and that is indicative of successful creation of a second transaction resource of the first transaction, and receive a response that is sent by the first managed object device and that is indicative of successful creation of a first transaction resource of the first transaction.

With reference to the third aspect, in a first possible implementation manner of the third aspect, the sending module is further configured to send a third transaction resource creation request for a second transaction to the first managed object device, where the third transaction resource creation request includes the identifier of the first to-be-operated resource, a third execution time, and a third to-be-executed operation; and further configured to send a fourth transaction resource creation request for the second transaction to the second managed object device, where the fourth transaction resource creation request includes the identifier of the second to-be-operated resource, a fourth execution time, and a fourth to-be-executed operation, and the third execution time and the fourth execution time are the same. The receiving module is further configured to receive, within a preset time, a response that is sent by the first managed object device and that is indicative of creation failure of a third transaction resource of the second transaction, and receive, within the preset time, a response that is sent by the second managed object device and that is indicative of successful creation of a fourth transaction resource of the second transaction. The response indicative of successful creation of the fourth transaction resource carries an identifier of the fourth transaction resource. The sending module is further configured to send, based on the response indicative of unsuccessful creation of the third transaction resource of the second transaction and the response indicative of successful creation of the fourth transaction resource of the second transaction, a processing request for the fourth transaction resource of the second transaction to the second managed object device that sends the response indicative of successful creation of the fourth transaction resource, where the processing request for the fourth transaction resource of the second transaction carries the identifier of the fourth transaction resource.

With reference to the first possible implementation manner of the third aspect, in a second possible implementation manner of the third aspect, the sending module is specifically configured to determine that the response indicative of unsuccessful creation of the third transaction resource of the second transaction is a first failure response that does not carry an updated third execution time, and send a deletion request carrying the identifier of the fourth transaction resource to the second managed object device that sends the response indicative of successful creation of the fourth transaction resource; or determine that the response indicative of unsuccessful creation of the third transaction resource of the second transaction is a second failure response carrying the updated third execution time, and send an update request carrying the updated third execution time and the identifier of the fourth transaction resource to the second managed object device that sends the response indicative of successful creation of the fourth transaction resource. The sending module is further configured to send a third transaction resource creation request carrying the updated third execution time to the first managed device.

According to a fourth aspect, an embodiment of the present invention provides a system for executing distributed transaction resources, applied to a machine to machine communications M2M system, where the M2M system includes at least two managed object devices and an application server, a first managed object device is any one of the at least two managed object devices, and a second managed object device is any managed object device in the at least two managed object devices except the first managed object device; and the system for executing distributed transaction resources includes the first managed object device and the second managed object device. The first managed object device is configured to receive a first transaction resource creation request sent by the application server for a first transaction, successfully create a first transaction resource of the first transaction according to the first transaction resource creation request, and send a response indicative of successful creation of the first transaction resource of the first transaction to the application server, where the first transaction resource creation request includes an identifier of a first to-be-operated resource, a first execution time, and a first to-be-executed operation. The second managed object device is configured to receive a second transaction resource creation request sent by the application server for the first transaction, successfully create a second transaction resource of the first transaction according to the second transaction resource creation request, and send a response indicative of successful creation of the second transaction resource of the first transaction to the application server. The second transaction resource creation request includes an identifier of a second to-be-operated resource, a second execution time, and a second to-be-executed operation, the first execution time and the second execution time are the same, the first transaction resource includes the first execution time and the first to-be-executed operation, and the second transaction resource includes the second execution time and the second to-be-executed operation. When the first execution time arrives, the first managed object device and the second managed device are configured to respectively execute the operations to be executed by the devices.

With reference to the fourth aspect, in a first possible implementation manner of the fourth aspect, the first managed object device is further configured to receive a third transaction resource creation request sent by the application server for a second transaction, determine that a third transaction resource of the second transaction fails to be created according to the third transaction resource creation request, and send a response indicative of unsuccessful creation of the third transaction resource of the second transaction to the application server, where the third transaction resource creation request includes the identifier of the first to-be-operated resource, a third execution time, and a third to-be-executed operation. The second managed object device is further configured to receive a fourth transaction resource creation request sent by the application server for the second transaction, successfully create a fourth transaction resource of the second transaction according to the fourth transaction resource creation request, and send a response indicative of successful creation of the fourth transaction resource of the second transaction to the application server, where the fourth transaction resource creation request includes the identifier of the second to-be-operated resource, a fourth execution time, and a fourth to-be-executed operation, the third execution time and the fourth execution time are the same, and the response indicative of successful creation of the fourth transaction resource carries an identifier of the fourth transaction resource. The second managed object device that sends the response indicative of successful creation of the fourth transaction resource to the application server is further configured to receive a processing request sent by the application server for the fourth transaction resource of the second transaction, and process the created fourth transaction resource according to the identifier of the fourth transaction resource. The processing request for the fourth transaction resource of the second transaction carries the identifier of the fourth transaction resource.

With reference to the first possible implementation manner of the fourth aspect, in a second possible implementation manner of the fourth aspect, the first managed object device is specifically configured to determine that a first transaction resource queue exists on the first managed object device, determine, according to the third execution time and a state of the first to-be-operated resource of the first managed object device, that the third transaction resource does not meet a preset resource creation condition, determine, according to the preset resource creation condition, to update the third execution time to a time later than an execution time of a transaction resource in the first transaction resource queue, and send a second failure response carrying the updated third execution time to the application server. The first transaction resource queue includes at least one transaction resource.

With reference to the first possible implementation manner of the fourth aspect or the second possible implementation manner of the fourth aspect, in a third possible implementation manner of the fourth aspect, the second managed object device is specifically configured to determine that a second transaction resource queue exists on the second managed object device, determine, according to the fourth execution time and a state of the second to-be-operated resource of the second managed object device, that the fourth transaction resource meets the preset resource creation condition, and create the fourth transaction resource, where the second transaction resource queue includes at least one transaction resource.

With reference to any one of the first possible implementation manner of the fourth aspect to the third possible implementation manner of the fourth aspect, in a fourth possible implementation manner of the fourth aspect, the processing request for the fourth transaction resource of the second transaction is an update request that carries the identifier of the fourth transaction resource and the updated third execution time; and the second managed object device is further configured to successfully update the fourth transaction resource according to the updated third execution time, and after the update succeeds, return an update success response message to the application server; or fail to update the fourth transaction resource according to the updated third execution time, and return an update failure response message to the application server.

With reference to the fourth possible implementation manner of the fourth aspect, in a fifth possible implementation manner of the fourth aspect, the second managed object device is further configured to delete the fourth transaction resource on the second managed object device according to the identifier of the fourth transaction resource, use the updated third execution time as an execution time of a new fourth transaction resource, determine, according to the execution time of the new fourth transaction resource and the state of the second to-be-operated resource of the second managed object device, that the new fourth transaction resource meets the preset resource creation condition, and create the new fourth transaction resource according to the updated third execution time.

With reference to any one of the first possible implementation manner of the fourth aspect to the third possible implementation manner of the fourth aspect, in a sixth possible implementation manner of the fourth aspect, the processing request for the fourth transaction resource of the second transaction is a deletion request that carries the identifier of the fourth transaction resource, and the second managed object device is further configured to delete the fourth transaction resource on the second managed object device according to the identifier of the fourth transaction resource.

With reference to the sixth possible implementation manner of the fourth aspect, in a seventh possible implementation manner of the fourth aspect, one transaction resource in the second transaction resource queue is in a reserved state, and the second managed object device is further configured to determine, according to the state of the second to-be-operated resource after a transaction resource at a first position in the second transaction resource queue is executed, whether a transaction resource at the second position can be executed successfully, where the first position is a position previous to the fourth transaction resource in the second transaction resource queue, and the second position is a position next to the fourth transaction resource in the second transaction resource queue. If the transaction resource at the second position is executed successfully, the second managed object device is further configured to send a first deletion response to the application server, and after the transaction resource at the first position is executed, update a state of the transaction resource at the second position to the reserved state; or if the transaction resource at the second position fails to be executed, the second managed object device is further configured to delete the transaction resource at the second position.

With reference to the sixth possible implementation manner of the fourth aspect, in an eighth possible implementation manner of the fourth aspect, at least two transaction resources in the second transaction resource queue are in a reserved state, and the second managed object device is further configured to determine whether a transaction resource in a semi-reserved state in the second transaction resource queue meets a preset deletion condition. If the transaction resource in the semi-reserved state in the second transaction resource queue meets the preset deletion condition, the second managed object device is further configured to delete the transaction resource in the semi-reserved state, and send a second deletion response to the application server; or if the transaction resource in the semi-reserved state in the second transaction resource queue does not meet the preset deletion condition, the second managed object device is further configured to determine, according to the state of the second to-be-operated resource after any transaction resource previous to the transaction resource in the semi-reserved state is executed, that the transaction resource in the semi-reserved state can be executed successfully, and update the transaction resource in the semi-reserved state to the reserved state.

According to a fifth aspect, an embodiment of the present invention provides a managed object device, applied to a machine to machine communications M2M system, where the M2M system includes at least two managed object devices and an application server, the managed object device is any one of the at least two managed object devices, and a second managed object device is any managed object device in the at least two managed object devices except the managed object device; and the managed object device includes: a receiving module, configured to receive a first transaction resource creation request sent by the application server for a first transaction. The first transaction resource creation request includes an identifier of a first to-be-operated resource, a first execution time, and a first to-be-executed operation, the first execution time is the same as a second execution time in a second transaction resource creation request for the first transaction, and the second transaction resource creation request is received by the second managed object device other than the managed object device in the M2M system. A creation module is configured to successfully create a first transaction resource according to the first transaction resource creation request, where the first transaction resource includes the first execution time and the first to-be-executed operation. A determining module is configured to determine, when the first execution time arrives, that a processing request sent by the application server for the first transaction resource of the first transaction is not received, where the processing request for the first transaction resource of the first transaction is sent after the application server receives a response that is sent by the second managed object device and that is indicative of unsuccessful creation of a second transaction resource of the first transaction. A processing module is configured to execute the first to-be-executed operation.

With reference to the fifth aspect, in a first possible implementation manner of the fifth aspect, the managed object device further includes a sending module. The receiving module is further configured to receive a third transaction resource creation request sent by the application server for a second transaction, where the third transaction resource creation request includes the identifier of the first to-be-operated resource, a third execution time, and a third to-be-executed operation, and the third execution time is the same as a fourth execution time in a fourth transaction resource creation request received by the second managed object device for the second transaction. The creation module is further configured to determine that a third transaction resource fails to be created according to the third transaction resource creation request. The sending module is configured to send a response indicative of unsuccessful creation of the third transaction resource of the second transaction to the application server.

With reference to the first possible implementation manner of the fifth aspect, in a second possible implementation manner of the fifth aspect, the creation module is specifically configured to determine that a first transaction resource queue exists on the managed object device, determine, according to the third execution time and a state of the first to-be-operated resource of the managed object device, that the third transaction resource does not meet a preset resource creation condition, and determine, according to the preset resource creation condition, to update the third execution time to a time later than an execution time of a transaction resource in the first transaction resource queue, where the first transaction resource queue includes at least one transaction resource. The sending module is specifically configured to send a second failure response carrying the updated third execution time to the application server.

With reference to the first possible implementation manner of the fifth aspect, in a third possible implementation manner of the fifth aspect, the managed object device further includes a sending module. The receiving module is further configured to receive a third transaction resource creation request sent by the application server for a second transaction, where the third transaction resource creation request includes the identifier of the first to-be-operated resource, a third execution time, and a third to-be-executed operation, and the third execution time is the same as a fourth execution time in a fourth transaction resource creation request received by the second managed object device for the second transaction. The creation module is further configured to successfully create the third transaction resource according to the third transaction resource creation request. The sending module is configured to send a response indicative of successful creation of the third transaction resource of the second transaction to the application server, where the response indicative of successful creation of the third transaction resource carries an identifier of the third transaction resource. The determining module is further configured to determine, before the third execution time arrives, that a processing request sent by the application server for the third transaction resource of the second transaction is received, where the processing request for the third transaction resource of the second transaction carries the identifier of the third transaction resource. The processing module is further configured to process the created third transaction resource according to the identifier of the third transaction resource.

With reference to the third possible implementation manner of the fifth aspect, in a fourth possible implementation manner of the fifth aspect, the creation module is specifically configured to determine that a first transaction resource queue exists on the managed object device, determine, according to the third execution time and a state of the first to-be-operated resource of the managed object device, that the third transaction resource meets a preset resource creation condition, and create the third transaction resource, where the first transaction resource queue includes at least one transaction resource.

With reference to the third possible implementation manner of the fifth aspect or the fourth possible implementation manner of the fifth aspect, in a fifth possible implementation manner of the fifth aspect, the processing request for the third transaction resource of the second transaction is an update request that carries the identifier of the third transaction resource and an updated fourth execution time, and the processing module is specifically configured to successfully update the third transaction resource according to the updated fourth execution time, and after the update succeeds, return an update success response message to the application server; or fail to update the third transaction resource according to the updated fourth execution time, and return an update failure response message to the application server.

With reference to the fifth possible implementation manner of the fifth aspect, in a sixth possible implementation manner of the fifth aspect, the processing module is specifically configured to delete the third transaction resource on the managed object device according to the identifier of the third transaction resource, use the updated fourth execution time as an execution time of a new third transaction resource, determine, according to the execution time of the new third transaction resource and the state of the first to-be-operated resource of the managed object device, that the new third transaction resource meets the preset resource creation condition, and create the new third transaction resource according to the updated fourth execution time.

With reference to the third possible implementation manner of the fifth aspect or the fourth possible implementation manner of the fifth aspect, in a seventh possible implementation manner of the fifth aspect, the processing request for the third transaction resource of the second transaction is a deletion request that carries the identifier of the third transaction resource, and the processing module is specifically configured to delete the third transaction resource on the managed object device according to the identifier of the third transaction resource.

With reference to the seventh possible implementation manner of the fifth aspect, in an eighth possible implementation manner of the fifth aspect, one transaction resource in the first transaction resource queue is in a reserved state, and the processing module is further configured to: determine, according to the state of the first to-be-operated resource after a transaction resource at a first position in the first transaction resource queue is executed, whether a transaction resource at the second position can be executed successfully; and if the transaction resource at the second position is executed successfully, send a first deletion response to the application server, and after the transaction resource at the first position is executed, update a state of the transaction resource at the second position to the reserved state; or if the transaction resource at the second position fails to be executed, delete the transaction resource at the second position; where the first position is a position previous to the third transaction resource in the first transaction resource queue, and the second position is a position next to the third transaction resource in the first transaction resource queue.

With reference to the seventh possible implementation manner of the fifth aspect, in a ninth possible implementation manner of the fifth aspect, at least two transaction resources in the first transaction resource queue are in a reserved state, and the processing module is further configured to: determine whether a transaction resource in a semi-reserved state in the first transaction resource queue meets a preset deletion condition; and if yes, delete the transaction resource in the semi-reserved state, and send a second deletion response to the application server; or if not, determine, according to the state of the first to-be-operated resource after any transaction resource previous to the transaction resource in the semi-reserved state is executed, that the transaction resource in the semi-reserved state can be executed successfully, and update the transaction resource in the semi-reserved state to the reserved state.

In the method, apparatus, and system for executing distributed transaction resources according to the embodiments of the present invention, transaction resource creation requests sent to multiple managed object devices carry a same execution time, so that when transaction resources are created successfully and the execution time arrives, the multiple managed object devices simultaneously execute the transaction resources created by the managed object devices, thereby ensuring that the transaction resources are executed simultaneously. In addition, in the embodiments of the present invention, to ensure that the transaction resources are executed simultaneously, an application server needs to send only one transaction resource creation request to a managed object device. Therefore, signaling overheads of the application server are reduced.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

FIG. 3 is a schematic flowchart of Embodiment 2 of a method for executing distributed transaction resources according to the present invention;

FIG. 4 is another schematic flowchart of Embodiment 2 of a method for executing distributed transaction resources according to the present invention;

FIG. 5 is another schematic flowchart of Embodiment 2 of a method for executing distributed transaction resources according to the present invention;

FIG. 6 is another schematic flowchart of Embodiment 2 of a method for executing distributed transaction resources according to the present invention;

FIG. 9 is a schematic flowchart of Embodiment 5 of a method for executing distributed transaction resources according to the present invention;

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solution in this application may be applied to a machine to machine (M2M for short hereinafter) communications system. The system may include at least two managed object devices and an application server. A first managed object device involved in this application may be any one of the at least two managed object devices, and a second managed object may be any managed object device in the at least two managed object devices except the first managed object device. If a managed object device in the M2M system is defined as the first managed object device, herein the second managed object device is any managed object device in the M2M system except the first managed object device. It should be noted that, the managed object device in this application may be a server, a communication gateway, or an M2M platform. The application server may be a transaction coordinator in the M2M system, or may be another management entity device.

In a RESTful architecture, the application server may be an infrastructure node-application entity (IN-AE for short hereinafter), an application service node-application entity (ASN-AE for short hereinafter), an application dedicated node-application entity (ADN-AE for short hereinafter), or a middle node-application entity (MN-AE for short hereinafter). The managed object device may be an infrastructure node-common service entity (IN-CSE for short hereinafter), a middle node-common service entity (MN-CSE for short hereinafter), or an application service node-common service entity (ASN-CSE for short hereinafter). In the RESTful architecture, a participant in a transaction includes one AE and multiple CSEs, where the AE is an application server in this application, and the CSEs are managed object devices in this application.

In addition, it should be noted that, one managed object device corresponds to only one to-be-operated resource, that is, identifiers of to-be-operated resources included in all transaction resource creation requests received by the managed object device are a same identifier. Different managed object devices correspond to different to-be-operated resources.

Figure 1:
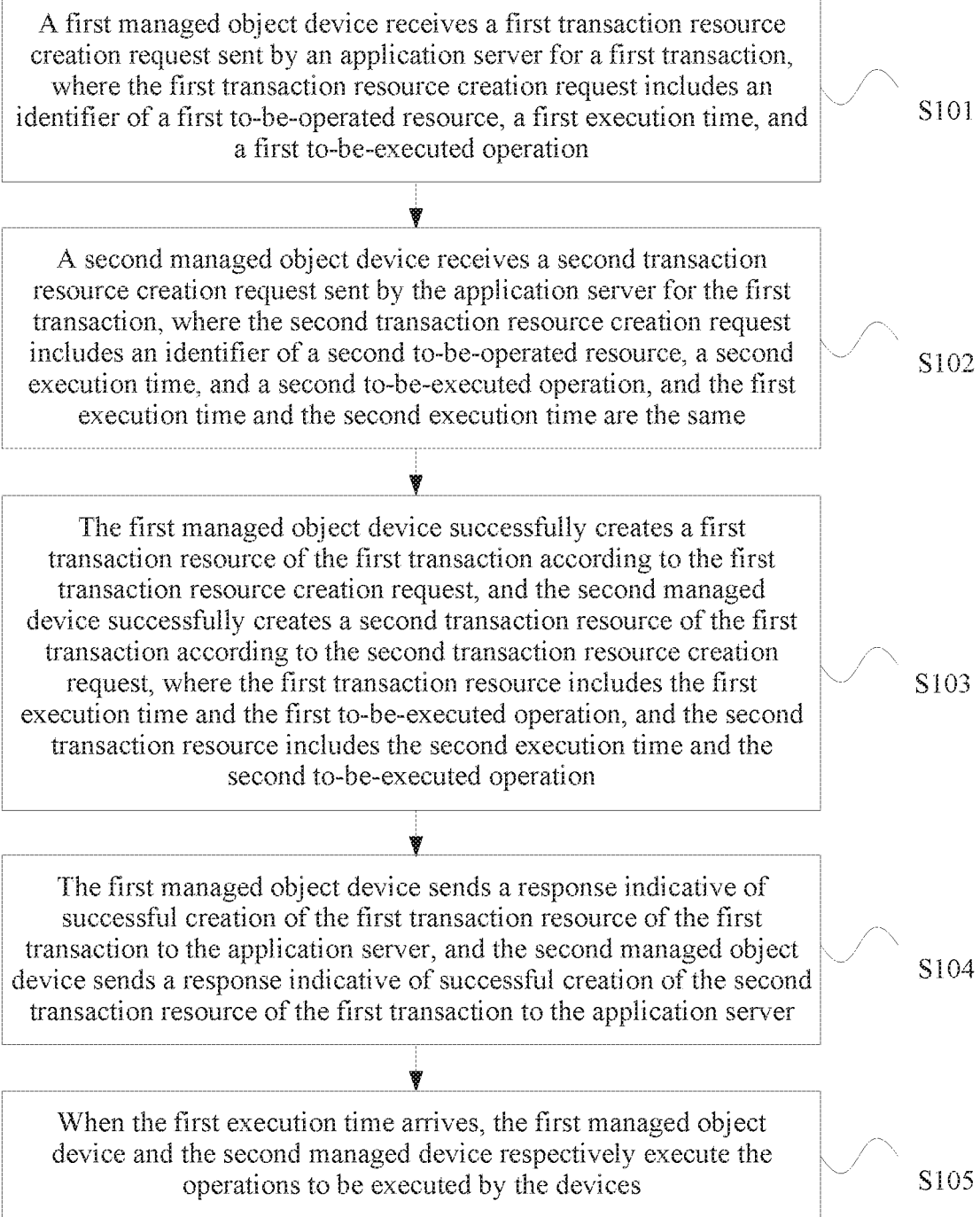
FIG. 1 is a schematic flowchart of Embodiment 1 of a method for executing distributed transaction resources according to the present invention.

FIG. 1 is a schematic flowchart of Embodiment 1 of a method for executing distributed transaction resources according to the present invention. This embodiment of the present invention relates to a specific process in which managed object devices simultaneously execute multiple transaction resources in a transaction of an application server, that is, a scenario in which for to-be-operated resources on managed object devices in an M2M system, there is no transaction resource of another transaction currently. As shown in FIG. 1, the method includes the following steps.

S101. A first managed object device receives a first transaction resource creation request sent by an application server for a first transaction, where the first transaction resource creation request includes an identifier of a first to-be-operated resource, a first execution time, and a first to-be-executed operation.

S102. A second managed object device receives a second transaction resource creation request sent by the application server for the first transaction, where the second transaction resource creation request includes an identifier of a second to-be-operated resource, a second execution time, and a second to-be-executed operation, and the first execution time and the second execution time are the same.

Specifically, the application server sends the first transaction resource creation request for the first transaction to the first managed object device and the second transaction resource creation request for the first transaction to the second managed object device separately, that is, both a first transaction resource and a second transaction resource belong to the first transaction of the application server. The first transaction resource creation request includes the identifier of the first to-be-operated resource, the first execution time, and the first to-be-executed operation. The second transaction resource creation request includes the identifier of the second to-be-operated resource, the second execution time, and the second to-be-executed operation. The first execution time and the second execution time are the same. Optionally, the first to-be-executed operation and the second to-be-executed operation may be the same or may be different. In addition, the first to-be-executed operation or the second to-be-executed operation may be reflected in a primitive form, or may be reflected in another manner.

S103. The first managed object device successfully creates a first transaction resource of the first transaction according to the first transaction resource creation request, and the second managed device successfully creates a second transaction resource of the first transaction according to the second transaction resource creation request, where the first transaction resource includes the first execution time and the first to-be-executed operation, and the second transaction resource includes the second execution time and the second to-be-executed operation.

It should be noted that, operations executed by the first managed device and the second managed object device are similar. Therefore, in all of the following technical solutions, the first managed object device is used as a described object. For the operation executed by the second managed object device, refer to the operation executed by the first managed object device. For the process of creating the second transaction resource by the second managed object device, refer to the process of creating the first transaction resource by the first managed object device.

Specifically, the first managed object device determines, according to information such as the first execution time and the first to-be-executed operation that are carried in the first transaction resource creation request, whether the first transaction resource can be created successfully. The first to-be-executed operation includes information such as an initiator of a request, an identifier of a requested target resource, and specific content that is requested.

Optionally, the first managed object device may determine, according to the information included in the first to-be-executed operation, whether the first transaction resource creation request meets a transaction resource creation condition. Specifically, the condition may include content of the following (1) to (4): (1) The first managed object device checks, according to "the identifier of the requested target resource" included in the first to-be-executed operation, whether the target resource requested for the first to-be-executed operation is the first to-be-operated resource. (2) The first managed object device checks, according to "the initiator of the request" included in the first to-be-executed operation, whether the initiator (namely, the application server) has enough rights to initiate the first transaction resource creation request. (3) The first managed object device checks, according to "the requested content" included in the first to-be-executed operation, whether the requested content can be executed for the first to-be-operated resource. For example, the first managed object device checks, by checking whether an attribute included in the first to-be-executed operation is within an allowed attribute range of the first managed object device, whether the requested content can be executed for the first to-be-operated resource. (4) The first managed object device checks, according to the first execution time and arrangements of work and sleep periods of the first managed object device, whether execution of the first to-be-executed operation carried in the first transaction resource creation request, at a time specified by the first execution time, can be ensured.

If the foregoing four items are all checked successfully, it indicates that the first transaction resource creation request meets the transaction resource creation condition, and the first managed object device can successfully create the first transaction resource according to the first transaction resource creation request. Based on a feature of a RESTful architecture, the created first transaction resource includes three attributes, namely, a state of the first transaction resource, the first execution time, and the first to-be-executed operation (correspondingly, the second transaction resource includes three attributes, namely, a state of the second transaction resource, the second execution time, and the second to-be-executed operation).

It should be noted that, the first transaction resource includes three attributes, namely, the state, the execution time, and the to-be-executed operation. The state indicates the state of the current transaction resource. The state may be a reserved state, or may be a semi-reserved state. The reserved state means that the managed object device can ensure successful execution of the to-be-executed operation in the transaction resource when the execution time arrives, that is, the managed object device has checked various conditions required for executing the transaction resource, including an access right, attribute consistency, and the like. The semi-reserved state is a general state of transaction resources in a transaction resource queue, that is, whether the managed object device can successfully execute the transaction resource depends on a state of the first to-be-operated resource after one or more transaction resources in the transaction resource queue are executed. The execution time (indicated by Texec) indicates the execution time of the current transaction resource, and is used to instruct the managed object device to execute the to-be-executed operation in the transaction resource when the execution time arrives. The to-be-executed operation (indicated by a Primitive) indicates a to-be-executed request, that is, including all information required for processing the to-be-operated resource on the managed object device.

In addition, the transaction resource is associated with the to-be-operated resource on the managed object device, that is, the target resource requested for the to-be-executed operation in the transaction resource is the to-be-operated resource. A manner of associating the transaction resource with the to-be-operated resource may be that an identifier of the transaction resource is an attribute of the to-be-operated resource, or may be that the transaction resource is a sub-resource of the to-be-operated resource. Specifically, the to-be-operated resource may include an identifier of one or more transaction resources, or an identifier of a transaction resource may directly include the identifier of the to-be-operated resource.

S104. The first managed object device sends a response indicative of successful creation of the first transaction resource of the first transaction to the application server, and the second managed object device sends a response indicative of successful creation of the second transaction resource of the first transaction to the application server.

Specifically, after the first managed object device successfully creates the first transaction resource, the first managed object device sends the response indicative of successful creation of the first transaction resource of the first transaction to the application server. In a time period in which the first managed object device waits for arrival of the first execution time, optionally, the first managed object device determines whether a processing request sent by the application server for the first transaction resource of the first transaction is received. Because one transaction on the application server includes multiple transaction resources, the application server sends different transaction resource creation requests to multiple managed object devices, so as to create transaction resources that belong to one transaction on the managed object devices. In this embodiment, if the second managed object device does not successfully create the second transaction resource, the second managed object device sends a response indicative of unsuccessful creation of the second transaction resource to the application server. After receiving the response indicative of creation failure of the second transaction resource, the application server sends the processing request for the first transaction resource of the first transaction to the first managed object device, so as to instruct the first managed object device to delete or update the first transaction resource that is created successfully. If the second managed object device creates the second transaction resource successfully, the second managed object device sends the response indicative of successful creation of the second transaction resource of the first transaction to the application server. Therefore, the application server does not send the processing request for the first transaction resource of the first transaction to the first managed object device.

S105. When the first execution time arrives, the first managed object device and the second managed device respectively execute the operations to be executed by the devices.

Specifically, when the first execution time arrives, if the first managed object device has not received the processing request sent by the application server for the first transaction resource of the first transaction, it indicates that the second transaction resource is also created successfully on the second managed object device in the M2M system. Therefore, the first managed object device executes, according to the first to-be-executed operation in the created first transaction resource, the first to-be-executed operation on the first to-be-operated resource indicated by the identifier of the first to-be-operated resource. Further, because the second transaction resource is also created successfully on the second managed object device in the M2M system, and the second managed object device has not received a processing request sent by the application server for the second transaction resource of the first transaction, either, the second managed object device may also execute, at the second execution time, the second to-be-executed operation on the second to-be-operated resource indicated by the identifier of the second to-be-operated resource. That is, the first managed object device and the second managed object device simultaneously execute the first to-be-executed operation and the second to-be-executed operation respectively, that is, simultaneously execute the transaction resources included in the same transaction.

For better describing the technical solution of this embodiment of the present invention, herein an example of intelligent irrigation in the background is used for description.

Figure 2:
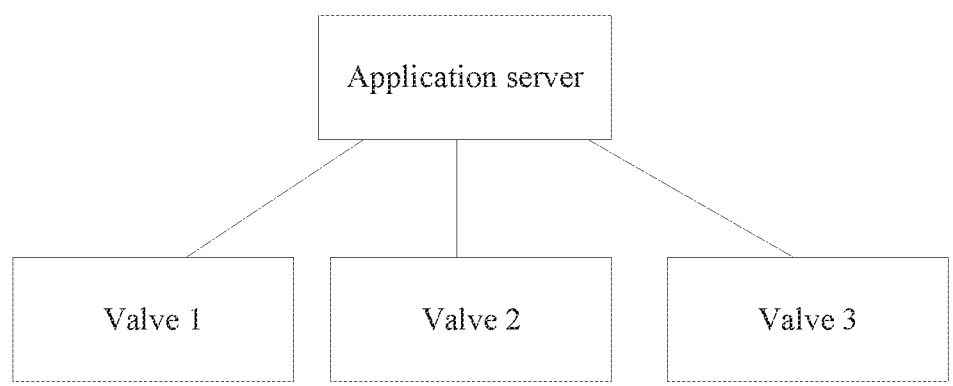
FIG. 2 is a schematic diagram of an M2M network architecture for intelligent irrigation according to the present invention.

In the example of intelligent irrigation, an application server is a network application registered with an M2M platform, and managed object devices are valves distributed in different farmland. Referring to an M2M network architecture for intelligent irrigation shown in FIG. 2, the M2M system includes one application server and three valves. A valve 1 is a first managed object device, and a valve 2 and a valve 3 are both second managed object devices.

The application server sends transaction resource creation requests to the valve 1, the valve 2, and the valve 3 respectively. A transaction resource creation request sent to the valve 1 is a first transaction resource creation request. A transaction resource creation request sent to the valve 2 is a second transaction resource creation request. A transaction resource creation request sent to the valve 3 is another second transaction resource creation request. Execution times in the transaction resource creation requests sent by the application server to the three valves are all 12:00, and the transaction resource creation requests respectively include requests for adjusting different valves. The first transaction resource creation request sent to the valve 1 is a request for adjusting an opening degree of the valve 1 to 20% (namely, a first to-be-executed operation). The second transaction resource creation request sent to the valve 2 is a request for adjusting an opening degree of the valve 2 to 30% (namely, a second to-be-executed operation). The second transaction resource creation request sent to the valve 3 is a request for adjusting an opening degree of the valve 3 to 40% (namely, another second to-be-executed operation).

Using the valve 1 as an example (for operations executed by the valve 2 and the valve 3, refer to operations executed by the valve 1), the valve 1 first checks whether the application server has a right to create a first transaction resource, and then checks the first to-be-executed operation included in the first transaction resource creation request, where content of the first to-be-executed operation is to adjust the valve 1 to 20%. The valve 1 further checks whether the application server has a right to adjust a to-be-operated resource on the valve 1, and checks whether 20% is within an adjustment range of the valve. Finally, the valve 1 concludes, according to a first execution time provided in the first transaction resource creation request and a sleep time of the valve 1, that the first transaction resource can be created successfully, that is, the valve 1 may ensure that the valve 1 is adjusted to 20% of full opening of the valve 1 at 12:00. In this example, because the valve 1 creates a transaction resource for the first time, that is, the to-be-operated resource of the valve 1 does not have a corresponding transaction resource queue, the valve 1 sets a current state of the first transaction resource to a reserved state, adds the state to a response indicative of successful creation of the first transaction resource, and sends the response to the application server.

The valve 2 and the valve 3 may execute similar steps. In this example, it is assumed that the valve 2 and the valve 3 can also ensure that the valves are adjusted to corresponding values at 12:00. Therefore, transaction resources created by the three valves are all in the reserved state. In this embodiment, because the three valves all return responses about successful creation of transaction resources, the application server does not initiate any request in a time period of waiting for arrival of the execution time.

When the execution time specified in the transaction resources created by the three valves arrives, that is, when the time 12:00 arrives, the three valves simultaneously execute content of the operations to be executed by the valves. That is, the valve 1 adjusts its opening degree to 20%, the valve 2 adjusts its opening degree to 30%, and the valve 3 adjusts its opening degree to 40%.

In this embodiment of the present invention, transaction resource creation requests sent to multiple managed object devices carry a same execution time, so that when it is determined that transaction resources are created successfully and the execution time arrives, the multiple managed object devices simultaneously execute the transaction resources created by the managed object devices, thereby ensuring that the transaction resources are executed simultaneously. In addition, in this embodiment of the present invention, to ensure that the transaction resources are executed simultaneously, an application server needs to send only one transaction resource creation request to a managed object device. Therefore, signaling overheads of the application server are reduced.

FIG. 3 is a schematic flowchart of Embodiment 2 of a method for executing distributed transaction resources according to the present invention. Based on the foregoing embodiment, the method used in this embodiment is a process in which the first managed object device determines that a third transaction resource of a second transaction fails to be created, and sends a response indicative of unsuccessful creation of the third transaction resource of the second transaction to the application server. as shown in FIG. 3, the method further includes the following steps.

S201. The first managed object device receives a third transaction resource creation request sent by the application server for a second transaction, where the third transaction resource creation request includes the identifier of the first to-be-operated resource, a third execution time, and a third to-be-executed operation.

S202. The second managed object device receives a fourth transaction resource creation request sent by the application server for the second transaction, where the fourth transaction resource creation request includes the identifier of the second to-be-operated resource, a fourth execution time, and a fourth to-be-executed operation, and the third execution time and the fourth execution time are the same.

Specifically, the application server sends the third transaction resource creation request for the second transaction to the first managed object device and the fourth transaction resource creation request for the second transaction to the second managed object device respectively. The third transaction resource creation request includes the identifier of the first to-be-operated resource, the third execution time, and the third to-be-executed operation. The fourth transaction resource creation request includes the identifier of the second to-be-operated resource, the fourth execution time, and the fourth to-be-executed operation. The third execution time and the fourth execution time are the same. Optionally, the third to-be-executed operation and the fourth to-be-executed operation may be the same or may be different. In addition, the third to-be-executed operation or the fourth to-be-executed operation may be reflected in a primitive form, or may be reflected in another manner.

S203. The first managed object device determines that a third transaction resource of the second transaction fails to be created according to the third transaction resource creation request, and sends a response indicative of unsuccessful creation of the third transaction resource of the second transaction to the application server.

S204. The second managed device successfully creates a fourth transaction resource of the second transaction according to the fourth transaction resource creation request, and sends a response indicative of successful creation of the fourth transaction resource of the second transaction to the application server, where the response indicative of successful creation of the fourth transaction resource carries an identifier of the fourth transaction resource.

It should be noted that, operations executed by the first managed device and the second managed object device are similar. Therefore, in all of the following technical solutions, the first managed object device is used as a described object. For the operation executed by the second managed object device, refer to the operation executed by the first managed object device. For the process of creating the fourth transaction resource by the second managed object device, refer to the process of creating the third transaction resource by the first managed object device.

Specifically, the first managed object device determines, according to information such as the third execution time and the third to-be-executed operation carried in the third transaction resource creation request, whether the third transaction resource can be created successfully. The third to-be-executed operation includes a request for the first to-be-operated resource, where the request may include information such as an initiator of the request, an identifier of a requested target resource, and specific content that is requested.

Optionally, the first managed object device may determine, according to the information included in the third to-be-executed operation, whether the third transaction resource creation request meets a transaction resource creation condition. The condition may specifically include content of the following (1) to (4): (1) The first managed object device checks, according to "the identifier of the requested target resource" included in the third to-be-executed operation, whether the target resource requested for the third to-be-executed operation is the first to-be-operated resource. (2) The first managed object device checks, according to "the initiator of the request" included in the third to-be-executed operation, whether the initiator (namely, the application server) has enough rights to initiate the request. (3) The first managed object device checks, according to "the requested content" included in the third to-be-executed operation, whether the requested content can be executed for the first to-be-operated resource. (4) The first managed object device checks, according to the third execution time and arrangements of work and sleep periods of the first managed object device, whether execution of the third to-be-executed operation carried in the third transaction resource creation request, at a time specified by the third execution time, can be ensured.

If any one of the foregoing four items fails to be checked, it indicates that the third transaction resource creation request does not meet the transaction resource creation condition. The first managed object device determines that the third transaction resource fails to be created, and sends the response indicative of unsuccessful creation of the third transaction resource to the application server.

Further, the second managed device successfully creates the fourth transaction resource of the second transaction according to the fourth transaction resource creation request (for details, refer to the process of creating the third transaction resource), and sends the response indicative of successful creation of the fourth transaction resource of the second transaction to the application server, where the response indicative of successful creation of the fourth transaction resource carries the identifier of the fourth transaction resource.

After the application server receives the response that is sent by the first managed object device and that is indicative of unsuccessful creation of the third transaction resource of the second transaction and the response that is sent by the second managed object device and that is indicative of successful creation of the fourth transaction resource of the second transaction, the application server determines to send a processing request for the fourth transaction resource of the second transaction to the second managed object device that successfully creates the fourth transaction resource, where the processing request for the fourth transaction resource of the second transaction carries the identifier of the fourth transaction resource.

S205. The second managed object device that sends the response indicative of successful creation of the fourth transaction resource to the application server receives a processing request sent by the application server for the fourth transaction resource of the second transaction, where the processing request for the fourth transaction resource of the second transaction carries the identifier of the fourth transaction resource.

Specifically, the processing request for the fourth transaction resource of the second transaction may be a deletion request for deleting the fourth transaction resource, or may be an update request for updating the fourth execution time in the fourth transaction resource, so that the second managed object device obtains a new fourth transaction resource (when the first managed object device determines that the third execution time in the third transaction resource creation request is not appropriate, the first managed object device sends a response indicative of unsuccessful creation of the third transaction resource, where the response carries the updated third execution time; therefore, the application server sends a processing request that carries the updated third execution time to the second managed object device; certainly, the first managed object device may also create a new third transaction resource according to the updated third execution time).

S206. The second managed object device that sends the response indicative of successful creation of the fourth transaction resource to the application server processes the created fourth transaction resource according to the identifier of the fourth transaction resource.

Specifically, after the second managed object device that sends the response indicative of successful creation of the fourth transaction resource to the application server receives the processing request sent by the application server for the fourth transaction resource of the second transaction, the second managed object device processes, according to the identifier of the fourth transaction resource carried in the processing request, the fourth transaction resource that is already successfully created on the second managed object device.

Optionally, the second managed object device may delete the fourth transaction resource on the second managed object device to ensure atomicity of the second transaction (because the third transaction resource fails to be created, and the second transaction itself cannot be executed successfully, the fourth transaction resource that also belongs to the second transaction should be deleted even if it is created successfully).

Optionally, the time of executing the fourth to-be-executed operation in the fourth transaction resource on the second managed object device may be updated, so that the time of executing the third to-be-executed operation in the new third transaction resource by the first managed object device is consistent with the time of executing the fourth to-be-executed operation in the new fourth transaction resource by the second managed object device. In addition, before the updated third execution time arrives, the application server does not send any processing request to the first managed object device and the second managed object device. Therefore, the first managed object device and the second managed object device can execute the transaction resources included in the same transaction.

In the method for executing distributed transaction resources according to this embodiment of the present invention, a first managed object device and a second managed object device respectively receive a third transaction resource creation request and a fourth transaction resource creation request that are sent by an application server and carry a same execution time; the second managed object device determines, according to a fourth execution time in the fourth transaction resource creation request, that a fourth transaction resource is created successfully, and receives, before the fourth execution time arrives, a processing request sent by the application server for the fourth transaction resource of a second transaction; and the second managed object device processes the created fourth transaction resource according to the processing request. In the method provided by this embodiment of the present invention, the second managed object device can ensure, according to the processing request sent by the application server for the fourth transaction resource of the second transaction (when the processing request is an update request), that a time of executing the updated fourth transaction resource by the second managed object device is the same as a time at which the first managed object device executes a new third transaction resource created by the first managed object device, that is, it is ensured that the first managed object device and the second managed object device can simultaneously execute operations to be executed by the devices. Therefore, simultaneous execution of transaction resources is ensured.

Based on the foregoing embodiment shown in FIG. 3, in a first possible implementation manner of this embodiment of the present invention, this embodiment of the present invention relates to a specific scenario in which a managed object device executes multiple transaction resources included in one transaction only and the execution fails (that is, the execution of the transaction fails), that is, a scenario in which for the first to-be-operated resource on the first managed object device in the M2M system, no transaction resource of another transaction is associated currently. The foregoing S203 may be specifically as follows:

If the first managed object device determines, according to the information included in the third to-be-executed operation, that the third transaction resource creation request does not meet the content of (1) in the foregoing transaction resource creation condition, the first managed object device determines, according to the third transaction resource creation request, that the third transaction resource fails to be created, and sends the response indicative of unsuccessful creation of the third transaction resource of the second transaction to the application server, so as to notify the application server that the third transaction resource cannot be created successfully.

If the first managed object device determines, according to the information included in the third to-be-executed operation, that the third transaction resource creation request does not meet the content of any one of (2) to (4) in the foregoing transaction resource creation condition, the first managed object device determines, according to the third transaction resource creation request, that the third transaction resource fails to be created, and sends the response indicative of unsuccessful creation of the third transaction resource to the application server, where the response carries the updated third execution time, so as to notify the application server that the current third execution time is not appropriate, but the first managed object device uses the updated third execution time carried in the response indicative of unsuccessful creation of the third transaction resource, and the third transaction resource can be created successfully.

For better describing the technical solution of this embodiment, herein the foregoing example of intelligent irrigation is still used for description.

The application server sends transaction resource creation requests to the valve 1, the valve 2, and the valve 3 respectively. A transaction resource creation request sent to the valve 1 is a third transaction resource creation request; a transaction resource creation request sent to the valve 2 is a fourth transaction resource creation request; a transaction resource creation request sent to the valve 3 is another fourth transaction resource creation request. Execution times in the transaction resource creation requests sent by the application server to the three valves are all 12:00, and the transaction resource creation requests respectively include requests for adjusting different valves. The third transaction resource creation request sent to the valve 1 is a request for adjusting an opening degree of the valve 1 to 20%; the fourth transaction resource creation request sent to the valve 2 is a request for adjusting an opening degree of the valve 2 to 30%; the fourth transaction resource creation request sent to the valve 3 is a request for adjusting an opening degree of the valve 3 to 40%.

Using the valve 1 as an example (for operations executed by the valve 2 and the valve 3, refer to the valve 1), the valve 1 first checks whether the application server has a right to create a third transaction resource, and then checks a third to-be-executed operation included in the third transaction resource creation request, where content of the third to-be-executed operation is to adjust the valve 1 to 20%; the valve 1 further checks whether the application server has a right to adjust the to-be-operated resource on the valve 1, and checks whether 20% complies with the adjustment range of the valve; finally, the valve 1 concludes, according to a third execution time provided in the third transaction resource creation request and a sleep time of the valve 1, that the third transaction resource cannot be created successfully because it does not comply with the content of (4) but can be created successfully at 12:01. Therefore, the valve 1 sends a response indicative of unsuccessful creation of the third transaction resource to the application server, where the response carries the updated third executed time (namely, 12:01). In this example, assuming that fourth transaction resources of the valve 2 and the valve 3 can be created successfully, that is, the fourth transaction resource creation requests received by the valve 2 and the valve 3 comply with the content of the foregoing (1) to (4), the valve 2 and the valve 3 send responses about successful creation of corresponding transaction resources to the application server, where the responses carry identifiers of the fourth transaction resources respectively created by the valve 2 and the valve 3, so as to notify the application server that the fourth transaction resources of the valve 2 and the valve 3 are created successfully.

Because currently the application server receives the response sent by the valve 1 about unsuccessful creation of the third transaction resource, and the response carries the updated third execution time, the application server sends a processing request for the fourth transaction resource of a second transaction to the valve 2 and the valve 3, where the processing request may be an update request that carries the updated third execution time and the identifier of the fourth transaction resource. Optionally, the update request may further carry a fourth to-be-executed operation; in addition, the application server further sends a new third transaction resource creation request to the valve 1, where the new third transaction resource creation request carries the updated third execution time, and optionally, may further carry the third to-be-executed operation.

When the valve 1 receives the new third transaction resource creation request, the valve 1 may also execute the content of (1) to (4). Because the valve 1 has determined that the third to-be-executed operation complies with the content of (1) to (3), the third to-be-executed operation carried in the new third transaction resource creation request is not changed, and the valve 1 may directly determine whether the updated third execution time complies with the content of (4); in addition, because the updated third execution time is a time recommended by the valve 1 to the application server according to a working state of the valve 1, the updated third execution time is a time that may ensure successful creation of the third transaction resource. The valve 2 and the valve 3 also execute the content of the foregoing (1) to (4) when receiving the update request sent by the application server. Because the valve 2 and the valve 3 have respectively determined that their fourth to-be-executed operation complies with the content of (1) to (3), and the fourth to-be-executed operation carried in the update request is not changed, the valve 2 and the valve 3 may also directly determine whether the updated third execution time complies with the content of (4). Assuming that the valve 2 determines that the updated third execution time in the received update request complies with the content of (4), that is, the fourth transaction resource on the valve 2 may be updated successfully, and assuming that the valve 3 determines that the updated third execution time in the received update request does not comply with the content of (4), that is, the valve 3 determines that the valve 3 has entered a sleep state when the updated third execution time arrives, and a time of resuming work is uncertain, the fourth transaction resource on the valve 3 cannot be created successfully, and the valve 3 already cannot support creation of any transaction resource locally. Therefore, the valve 3 sends a response indicative of unsuccessful creation of the fourth transaction resource of the second transaction to the application server, notifying the application server of the case that the valve 3 already cannot support creation of any transaction resource.

In this case, the new third transaction resource on the valve 1 has been created successfully, and the fourth transaction resource on the valve 2 has been updated successfully, but before the updated third execution time arrives, because the application server has received the response sent by the valve 3 about unsuccessful creation of the fourth transaction resource of the second transaction, and learned that the valve 3 already cannot support creation of any transaction resource, the application server sends deletion requests to the valve 1 and the valve 2, so as to delete the new third transaction resource on the valve 1 and the updated fourth transaction resource on the valve 2, and ensure atomicity of the transaction. Therefore, the current second transaction on the applications server cannot be executed successfully.

When the valve 1 receives the new third transaction resource creation request, if the valve 1 creates the new third transaction resource successfully according to the new third transaction resource creation request, and the valve 2 and the valve 3 update the fourth transaction resources successfully according to the updated third execution time in the update request, and before the updated third execution time arrives, none of the valve 1, the valve 2, and the valve 3 receives the processing request sent by the application server, when the updated third execution time arrives, the valve 1, the valve 2, and the valve 3 execute the new third transaction resource and the updated fourth transaction resources simultaneously.

In the method for executing distributed transaction resources according to this embodiment of the present invention, when a first managed object device fails to create a third transaction resource according to a third transaction resource creation request, the first managed object device sends a response indicative of unsuccessful creation of the third transaction resource of a second transaction to an application server, where the response indicative of unsuccessful creation of the third transaction resource carries the updated third execution time, so that the application server sends a new third transaction resource creation request to the first managed object device, so as to create a new third transaction resource. In addition, the application server sends a processing request for the fourth transaction resource of the second transaction to a second managed object device; when the processing request is an update request that carries the updated third execution time, the first managed object device and the second managed object device can process, according to the updated third execution time, transaction resources created by the devices respectively, and ensure that their current transaction resources can be executed simultaneously when the updated third execution time arrives.

In an actual M2M system, for a to-be-operated resource on a managed object device, usually a new transaction resource creation request is sent again when an existing transaction resource is not executed yet, and in this case, a transaction resource queue for the to-be-operated resource is formed. Therefore, based on the foregoing embodiment shown in FIG. 3, in a second possible implementation manner of this embodiment of the present invention, this embodiment of the present invention is applied to a scenario of processing concurrent transaction resources on a managed object device, that is, a scenario in which a transaction resource queue exists on the managed object device. This embodiment relates to a specific process in which the first managed object device fails to create the third transaction resource in a first transaction resource queue. Referring to FIG. 4, the foregoing S203 may specifically include the following steps.

S301. The first managed object device determines that a first transaction resource queue exists on the first managed object device, where the first transaction resource queue includes at least one transaction resource.

Because the operations executed by the first managed object device and the second managed object device are similar, in the following technical solution, the first managed object device is used as a main described object. For an operation executed by the second managed object device after the fourth transaction resource creation request is received, refer to the operation executed by the first managed object device after the third transaction resource creation request is received.

Specifically, after the first managed object device receives the third transaction resource creation request sent by the application server for the second transaction, the first managed object device determines, according to the identifier of the first to-be-operated resource that is carried in the third transaction resource creation request, whether the first transaction resource queue corresponding to the first to-be-operated resource exists. The first transaction resource queue includes at least one transaction resource, and transaction resources in the first transaction resource queue are arranged according to an execution time of each transaction resource in the first transaction resource queue. If the first managed object device determines that no first transaction resource queue exists on the first managed object device, the first managed object device may perform execution according to the technical solution in Embodiment 1 shown in FIG. 1 or in the first possible implementation manner of the embodiment shown in FIG. 3. Details are not described again herein. If it is determined that the first transaction resource queue exists, step 302 is executed.

S302. The first managed object device determines, according to the third execution time and a state of the first to-be-operated resource, that the third transaction resource does not meet a preset resource creation condition.

Specifically, when the first managed object device determines, according to the identifier of the first to-be-operated resource, that the first transaction resource queue exists on the first managed object device, the first managed object device performs arrangement and comparison according to the third execution time in the third transaction resource creation request and the execution time of each transaction resource in the first transaction resource queue, and determines a position for inserting the third transaction resource in the first transaction resource queue. It should be noted that, the first managed object device currently has not created the third transaction resource successfully. Herein the third transaction resource is a to-be-created transaction resource.

Further, the first managed object device may determine, according to the third execution time and the state of the first to-be-operated resource on the first managed object device, that the third transaction resource does not meet the preset resource creation condition, that is, determine that the third transaction resource fails to be created, and send the response indicative of unsuccessful creation of the third transaction resource of the second transaction to the application server. The state of the first to-be-operated resource is specifically a state of the first to-be-operated resource after at least one transaction resource in the first transaction resource queue is executed. That the first managed object device determines that the third transaction resource does not meet the preset resource creation condition may specifically include the following two cases A and B.

A. The first managed object device determines, according to the third execution time and the state of the first to-be-operated resource of the first managed object device, that the preset resource creation condition is not met if the third execution time is updated to any time later than the execution time of each transaction resource in the first transaction resource queue. The first managed object device sends a first failure response to the application server.

Optionally, when one transaction resource included in the first transaction resource queue is in the reserved state, and a transaction resource located at a first position in the first transaction resource queue is in the reserved state, the first managed object device determines, according to the third execution time and the state of the first to-be-operated resource, that the preset resource creation condition is not met when the third execution time is updated to any time later than the execution time of each transaction resource in the first transaction resource queue. Specifically, the following three cases a, b, and c may be included. It should be noted that, for details about the preset resource creation condition, refer to content described in a, b, and c. In addition, the preset resource creation condition is different from the content of (1) to (4) in the foregoing embodiment. For example, in the following preset resource creation condition a, when the third transaction resource is located at the first position in the queue, the first managed object device determines that the third transaction resource cannot be executed successfully if the third transaction resource is inserted in any other position in the first transaction resource queue. As long as this condition is met, the first managed object device determines that the third transaction resource fails to be created. However, for how to specifically determine whether the third transaction resource can be executed successfully when the third transaction resource is located in any other position in the first transaction resource queue, a specific determining step may be determining according to the content of (1) to (4) in the foregoing embodiment.

a. If it is determined, according to the third execution time, that no transaction resource in the first transaction resource queue exists before the position for inserting the third transaction resource in the first transaction resource queue, and if the first managed object device updates the third execution time of the third transaction resource to any time later than the execution time of each transaction resource in the first transaction resource queue (that is, if the first managed object device inserts the third transaction resource into any other position in the first transaction resource queue), the first managed object device determines that the third transaction resource cannot be executed successfully when the third execution time arrives. That is, the first managed object device determines, according to the status of the first to-be-operated resource after any transaction resource in the first transaction resource queue is executed, that the third transaction resource cannot be switched to the reserved state. In this case, the first managed object device determines that the third transaction resource fails to be created, and sends the first failure response to the application server, so that the application server sends the processing request for the fourth transaction resource of the second transaction to the second managed object device that receives the fourth transaction resource creation request, where the processing request is a deletion request that carries the identifier of the fourth transaction resource, and the deletion request is used to delete the fourth transaction resource successfully created on the second managed object device.

It should be noted that, the transaction resource in this embodiment of the present invention cannot be executed successfully at the execution time may also be understood to be that the transaction resource cannot be switched to the reserved state. In addition, as described above, in the case a, the foregoing state of the first to-be-operated resource is the state of the first to-be-operated resource after a transaction resource in any position in the first transaction resource queue is executed.

b. If it is determined, according to the third execution time, that transaction resources in the first transaction resource queue exist both before and after the position for inserting the third transaction resource in the first transaction resource queue, the first managed object device determines, according to the state of the first to-be-operated resource after a transaction resource in a third position is executed, whether the third transaction resource can be executed successfully, where the third position is a previous position adjacent to the position for inserting the third transaction resource in the first transaction resource queue.

If the first managed object device determines, according to the state of the first to-be-operated resource after the transaction resource in the third position is executed, that the third transaction resource cannot be executed successfully, and if the third execution time of the third transaction resource is updated to any time later than the execution time of each transaction resource in the first transaction resource queue (that is, when inserting the third transaction resource into any other position in the first transaction resource queue), the first managed object device determines that the third transaction resource also cannot be executed successfully. That is, based on the state after any transaction resource in the first transaction resource queue is executed, the third transaction resource cannot be switched to the reserved state. In this case, the first managed object device determines that the third transaction resource fails to be created, and sends the first failure response to the application server, so that the application server sends the processing request for the fourth transaction resource of the second transaction to the second managed object device that receives the fourth transaction resource creation request, where the processing request is a deletion request that carries the identifier of the fourth transaction resource, and the deletion request is used to delete the fourth transaction resource successfully created on the second managed object device.

If the first managed object device determines, according to the state of the first to-be-operated resource after the transaction resource in the third position is executed, that the third transaction resource can be executed successfully, and determines, according to the state of the first to-be-operated resource after the third transaction resource is executed, that a transaction resource in a fourth position in the first transaction resource queue cannot be executed successfully (the fourth position is a next position adjacent to the position for inserting the third transaction resource in the first transaction resource queue), and determines to update the third execution time of the third transaction resource to any time later than the execution time of each transaction resource in the first transaction resource queue (that is, when determining that the third transaction resource is inserted into any other position in the first transaction resource queue), the first managed object device determines that the third transaction resource also cannot be executed successfully. That is, based on the state after any transaction resource in the first transaction resource queue is executed, the third transaction resource cannot be switched to the reserved state. In this case, the first managed object device determines that the third transaction resource fails to be created, and sends the first failure response to the application server, so that the application server sends the processing request for the fourth transaction resource of the second transaction to the second managed object device that receives the fourth transaction resource creation request, where the processing request is a deletion request that carries the identifier of the fourth transaction resource, and the deletion request is used to delete the fourth transaction resource successfully created on the second managed object device.

As described above, in the case b, the foregoing state of the first to-be-operated resource may be the state of the first to-be-operated resource after the transaction resource in the third position is executed, or may be the state of the first to-be-operated resource after the third transaction resource is executed, or may be the state of the first to-be-operated resource after any transaction resource in the first transaction resource queue is executed. The status of the first to-be-operated resource is determined according to different cases.

c. If it is determined, according to the third execution time, that a transaction resource in the first transaction resource queue exists before the position for inserting the third transaction resource in the first transaction resource queue, but no transaction resource in the first transaction resource queue exists after the inserting position, the first managed object device determines, according to the state of the first to-be-operated resource after the transaction resource in the third position is executed, whether the third transaction resource can be executed successfully.

If the first managed object device determines, according to the state of the first to-be-operated resource after the transaction resource in the third position is executed, that the third transaction resource cannot be executed successfully, and determines to update the third execution time of the third transaction resource to any time later than the execution time of each transaction resource in the first transaction resource queue (that is, when inserting the third transaction resource into any other position in the first transaction resource queue), the first managed object device determines that the third transaction resource also cannot be executed successfully. That is, based on the state after any transaction resource in the first transaction resource queue is executed, the third transaction resource cannot be switched to the reserved state. In this case, the first managed object device determines that the third transaction resource fails to be created, and sends the first failure response to the application server, so that the application server sends the processing request for the fourth transaction resource of the second transaction to the second managed object device that receives the fourth transaction resource creation request, where the processing request is a deletion request that carries the identifier of the fourth transaction resource, and the deletion request is used to delete the fourth transaction resource successfully created on the second managed object device.

As described above, in the case c, the foregoing state of the first to-be-operated resource may be the state of the first to-be-operated resource after the transaction resource in the third position is executed, or may be the state of the first to-be-operated resource after any transaction resource in the first transaction resource queue is executed. Content of the state of the first to-be-operated resource is determined according to different cases.

Optionally, when at least two transaction resources included in the first transaction resource queue are in the reserved state, the first managed object device determines, according to the third execution time and the state of the first to-be-operated resource, that the preset resource creation condition is not met when the third execution time is updated to any time later than the execution time of each transaction resource in the first transaction resource queue. Specifically, the following two cases d and e may be included. It should be noted that, for details about the preset resource creation condition, refer to the determining conditions described in d and e.

d. If the first managed object device determines, according to the state of the first to-be-operated resource after the third transaction resource is executed, that none of other transaction resources in the reserved state in the first transaction resource queue after the position for inserting the third transaction resource in the first transaction resource queue can be executed or that one of them cannot be executed successfully, and determines to update the third execution time of the third transaction resource to any time later than the execution time of each transaction resource in the first transaction resource queue (that is, when inserting the third transaction resource into any other position in the first transaction resource queue), the first managed object device determines, according to the state of the first to-be-operated resource after the transaction resource in the any other position in the first transaction resource queue is executed, that none of transaction resources in the reserved state after the any other position also cannot be executed successfully or that one of them cannot be executed successfully. In this case, the first managed object device determines that the third transaction resource fails to be created, and sends the first failure response to the application server, so that the application server sends the processing request for the fourth transaction resource of the second transaction to the second managed object device that receives the fourth transaction resource creation request, where the processing request is a deletion request that carries the identifier of the fourth transaction resource, and the deletion request is used to delete the fourth transaction resource successfully created on the second managed object device.

As described above, in the case d, the foregoing state of the first to-be-operated resource may be the state of the first to-be-operated resource after the third transaction resource is executed, or may be the state of the first to-be-operated resource after the transaction resource in any other position in the first transaction resource queue is executed. Content of the state of the first to-be-operated resource is determined according to different cases.

e. If the first managed object device determines, according to the state of the first to-be-operated resource after the third transaction resource is executed, that any other transaction resource in the reserved state after the position for inserting the third transaction resource in the first transaction resource queue can be executed successfully, the first managed object device further determines whether any other transaction resource in the first transaction resource queue exists before the inserting position.

If another transaction resource in the first transaction resource queue exists before the position for inserting the third transaction resource in the first transaction resource queue, the first managed object device determines, according to the state of the first to-be-operated resource after any transaction resource in the other transaction resources existing before the inserting position in the first transaction resource queue is executed, whether the third transaction resource can be executed successfully; and if not, the first managed object device further determines, according to the state of the first to-be-operated resource after the transaction resource in the third position in the first transaction resource queue is executed, whether the third transaction resource can be executed successfully. If not, the first managed object device further determines whether the third transaction resource can be executed successfully if the execution time of the third transaction resource is updated to any time later than the execution time of each transaction resource in the first transaction resource (that is, determining whether the third transaction resource can be executed successfully if the third transaction resource is inserted into any other position in the first transaction resource queue). When the first managed object device determines that the third transaction resource cannot be executed successfully if the third transaction resource is inserted into the any other position in the first transaction resource queue, the first managed object device determines that the third transaction resource fails to be created, and sends the first failure response to the application server, so that the application server sends the processing request for the fourth transaction resource of the second transaction to the second managed object device that receives the fourth transaction resource creation request, where the processing request is a deletion request that carries the identifier of the fourth transaction resource, and the deletion request is used to delete the fourth transaction resource successfully created on the second managed object device.

As described above, in the case e, the foregoing state of the first to-be-operated resource may be the state of the first to-be-operated resource after the third transaction resource is executed, or may be the state of the first to-be-operated resource after any transaction resource previous to the foregoing determined inserting position is executed, or may be the state of the first to-be-operated resource after the transaction resource in the third position is executed, or may be the state of the first to-be-operated resource after the transaction resource in any other position in the first transaction resource queue is executed. Content of the state of the first to-be-operated resource is determined according to different cases.

In summary, all the foregoing five cases a, b, c, d, and e are cases in which the first managed object device determines, according to the third execution time and the state of the first to-be-operated resource, that the preset resource creation condition is not met when the third execution time of the third transaction resource is updated to any time later than the execution time of each transaction resource in the first transaction resource queue.

B. The first managed object device determines, according to the third execution time and the state of the first to-be-operated resource of the first managed object device, that the third transaction resource does not meet the preset resource creation condition. In this case, the first managed object device updates the third execution time to a time later than an execution time of a transaction resource in the first transaction resource queue according to the preset resource creation condition (that is, the time causes the third transaction resource to meet the preset resource creation condition). The first managed object device sends a second failure response carrying the updated third execution time to the application server.

Optionally, when one transaction resource included in the first transaction resource queue is in the reserved state, and the transaction resource located at the first position in the first transaction resource queue is in the reserved state, the first managed object device determines, according to the third execution time and the state of the first to-be-operated resource, that the preset resource creation condition is met when the third execution time is updated to a time later than an execution time of a transaction resource in the first transaction resource queue. Specifically the following three cases f, g, and h may be included. It should be noted that, for details about the preset resource creation condition, refer to the determining conditions described in f, g, and h.

f. If it is determined, according to the third execution time, that no transaction resource in the first transaction resource queue exists before the position for inserting the third transaction resource in the first transaction resource queue, and the first managed object device determines to update the third execution time of the third transaction resource to a time later than an execution time of a transaction resource in the first transaction resource queue (that is, if the first managed object device determines that the third transaction resource is inserted into a position in the first transaction resource queue), the first managed object device determines, according to the state of the first to-be-operated resource after the transaction resource in the position is executed, that the third transaction resource can be executed successfully. In this case, the first managed object device determines that the third transaction resource fails to be created, and sends the second failure response that carries the updated third execution time to the application server, so that the application server sends the processing request for the fourth transaction resource of the second transaction to the second managed object device that receives the fourth transaction resource creation request, where the processing request is an update request that carries the updated third execution time and the identifier of the fourth transaction resource; therefore, the application server sends a new third transaction resource creation request that carries the updated third execution time to the first managed object device, so as to create a new third transaction resource. The updated third execution time is a time of successfully creating the new third transaction resource by the first managed object device in the first transaction resource queue.

As described above, the state of the first to-be-operated resource in the case f may be the state of the first to-be-operated resource after a transaction resource in a position is executed if the third transaction resource is inserted into the position in the first transaction resource queue (execution of the transaction resource needs to ensure successful execution of the third transaction resource). Content of the state of the first to-be-operated resource is determined according to different cases.

g. If it is determined, according to the third execution time, that transaction resources in the first transaction resource queue exist both before and after the position for inserting the third transaction resource in the first transaction resource queue, the first managed object device determines, according to the state of the first to-be-operated resource after the transaction resource in the third position is executed, whether the third transaction resource can be executed successfully, where the third position is a previous position adjacent to the position for inserting the third transaction resource in the first transaction resource queue.

If the first managed object device determines, according to the state of the first to-be-operated resource after the transaction resource in the third position is executed, that the third transaction resource cannot be executed successfully, and determines to update the third execution time of the third transaction resource to a time later than an execution time of a transaction resource in the first transaction resource queue (that is, when inserting the third transaction resource into a position in the first transaction resource queue), the first managed object device determines, according to the state of the first to-be-operated resource after the transaction resource in the position is executed, that the third transaction resource can be executed successfully. In this case, the first managed object device determines that the third transaction resource fails to be created, and sends the second failure response that carries the updated third execution time to the application server, so that the application server sends the processing request for the fourth transaction resource of the second transaction to the second managed object device that receives the fourth transaction resource creation request, where the processing request is an update request that carries the updated third execution time and the identifier of the fourth transaction resource; therefore, the application server sends a new third transaction resource creation request that carries the updated third execution time to the first managed object device, so as to create a new third transaction resource. The updated third execution time is a time of successfully creating the new third transaction resource by the first managed object device in the first transaction resource queue.

If the first managed object device determines, according to the state of the first to-be-operated resource after the transaction resource in the third position is executed, that the third transaction resource can be executed successfully, and the first managed object device determines, according to the state of the first to-be-operated resource after the third transaction resource is executed, that the transaction resource in the fourth position in the first transaction resource queue cannot be executed successfully (the fourth position is a next position adjacent to the position for inserting the third transaction resource in the first transaction resource queue), and the first managed object device updates the third execution time of the third transaction resource to a time later than an execution time of a transaction resource in the first transaction resource queue (that is, when inserting the third transaction resource into a position in the first transaction resource queue), the first managed object device determines, according to the state of the first to-be-operated resource after the transaction resource in the position is executed, that the third transaction resource can be executed successfully. In this case, the first managed object device determines that the third transaction resource fails to be executed, and sends the second failure response that carries the updated third execution time to the application server, so that the application server sends the processing request for the fourth transaction resource of the second transaction to the second managed object device that receives the fourth transaction resource creation request, where the processing request is an update request that carries the updated third execution time and the identifier of the fourth transaction resource; therefore, the application server sends a new third transaction resource creation request that carries the updated third execution time to the first managed object device, so as to create a new third transaction resource. The updated third execution time is a time of successfully creating the new third transaction resource by the first managed object device in the first transaction resource queue.

As described above, the state of the first to-be-operated resource in the case g may be the state of the first to-be-operated resource after the transaction resource in the third position is executed, or may be the state of the first to-be-operated resource after the third transaction resource is executed, or may be the state of the first to-be-operated resource after a transaction resource in a position is executed if the third transaction resource is inserted into the position in the first transaction resource queue (execution of the transaction resource needs to ensure successful execution of the third transaction resource). Content of the state of the first to-be-operated resource is determined according to different cases.

h. If it is determined, according to the third execution time, that a transaction resource in the first transaction resource queue exists before the position for inserting the third transaction resource in the first transaction resource queue, but no transaction resource in the first transaction resource queue exists after the inserting position, the first managed object device determines, according to the state of the first to-be-operated resource after the transaction resource in the third position is executed, whether the third transaction resource can be executed successfully.

If the first managed object device determines, according to the state of the first to-be-operated resource after the transaction resource in the third position is executed, that the third transaction resource cannot be executed successfully, and determines to update the third execution time of the third transaction resource to a time later than an execution time of a transaction resource in the first transaction resource queue (that is, when inserting the third transaction resource into a position in the first transaction resource queue), the first managed object device determines, according to the state of the first to-be-operated resource after the transaction resource in the position is executed, that the third transaction resource can be executed successfully. In this case, the first managed object device determines that the third transaction resource fails to be created, and sends the second failure response that carries the updated third execution time to the application server, so that the application server sends the processing request for the fourth transaction resource of the second transaction to the second managed object device that receives the fourth transaction resource creation request, where the processing request is an update request that carries the updated third execution time and the identifier of the fourth transaction resource; therefore, the application server sends a new third transaction resource creation request that carries the updated third execution time to the first managed object device, so as to create a new third transaction resource. The updated third execution time is a time of successfully creating the new third transaction resource by the first managed object device in the first transaction resource queue.

It should be noted that, the state of the first to-be-operated resource in the case h may be the state of the first to-be-operated resource after the transaction resource in the third position is executed, or may be the state of the first to-be-operated resource after a transaction resource in a position is executed if the third transaction resource is inserted into the position in the first transaction resource queue (execution of the transaction resource needs to ensure successful execution of the third transaction resource). Content of the state of the first to-be-operated resource is determined according to different cases.

Optionally, when at least two transaction resources included in the first transaction resource queue are in the reserved state, the first managed object device determines, according to the third execution time and the state of the first to-be-operated resource, that the preset resource creation condition is met when the third execution time is updated to a time later than an execution time of a transaction resource in the first transaction resource queue. Specifically, the following two cases i and j may be included. It should be noted that, for details about the preset resource creation condition, refer to the determining conditions described in i and j.

i. If the first managed object device determines, according to the state of the first to-be-operated resource after the third transaction resource is executed, that none of other transaction resources in the reserved state in the first transaction resource queue after the position for inserting the third transaction resource in the first transaction resource queue can be executed or that one of them cannot be executed successfully, and determines to update the third execution time of the third transaction resource to a time later than an execution time of a transaction resource in the first transaction resource queue (that is, when inserting the third transaction resource into a position in the first transaction resource queue), all transaction resources in the reserved state after the time in the first transaction resource queue can be executed successfully (that is, the first managed object device determines, according to the state of the first to-be-operated resource after the transaction resource in the position is executed, that all the transaction resources in the reserved state in the first transaction resource queue after the position can be executed successfully). In this case, the first managed object device determines that the third transaction resource fails to be created, and sends the second failure response that carries the updated third execution time to the application server, so that the application server sends the processing request for the fourth transaction resource of the second transaction to the second managed object device that receives the fourth transaction resource creation request, where the processing request is an update request that carries the updated third execution time and the identifier of the fourth transaction resource; therefore, the application server sends a new third transaction resource creation request that carries the updated third execution time to the first managed object device, so as to create a new third transaction resource. The updated third execution time is a time of successfully creating the new third transaction resource by the first managed object device in the first transaction resource queue.

It should be noted that, the state of the first to-be-operated resource in the case i may be the state of the first to-be-operated resource after the third transaction resource is executed, or may be the state of the first to-be-operated resource after a transaction resource in a position is executed if the third transaction resource is inserted into the position in the first transaction resource queue (execution of the transaction resource needs to ensure successful execution of all the transaction resources in the reserved state in the first transaction resource queue after the position). Content of the state of the first to-be-operated resource is determined according to different cases.

j. If the first managed object device determines, according to the current state of the first to-be-operated resource after the third transaction resource is executed, that any other transaction resource in the reserved state after the position for inserting the third transaction resource in the first transaction resource queue can be executed successfully, the first managed object device further determines whether any other transaction resource in the first transaction resource queue exists before the inserting position.

If another transaction resource in the first transaction resource queue exists before the position for inserting the third transaction resource in the first transaction resource queue, the first managed object device determines, according to the state of the first to-be-operated resource after any transaction resource in the other transaction resources existing before the inserting position in the first transaction resource queue is executed, whether the third transaction resource can be executed successfully; and if not, the first managed object device further determines, according to the state of the first to-be-operated resource after the transaction resource in the third position in the first transaction resource queue is executed, whether the third transaction resource can be executed successfully. If not, the first managed object device further determines whether the third transaction resource can be executed successfully when the execution time of the third transaction resource is updated to a time later than an execution time of a transaction resource in the first transaction resource queue (that is, if the third transaction resource is inserted into a position in the first transaction resource queue, the first managed object device determines, according to the state of the first to-be-operated resource after the transaction resource in the position is executed, that the third transaction resource can be executed successfully). In this case, the first managed object device determines that the third transaction resource fails to be created, and sends the second failure response that carries the updated third execution time to the application server, so that the application server sends the processing request for the fourth transaction resource of the second transaction to the second managed object device that receives the fourth transaction resource creation request, where the processing request is an update request that carries the updated third execution time and the identifier of the fourth transaction resource; therefore, the application server sends a new third transaction resource creation request that carries the updated third execution time to the first managed object device, so as to create a new third transaction resource. The updated third execution time is a time of successfully creating the new third transaction resource by the first managed object device in the first transaction resource queue.

It should be noted that, the state of the first to-be-operated resource in the case i may be the state of the first to-be-operated resource after the third transaction resource is executed, or may be the state of the first to-be-operated resource after any transaction resource in the other transaction resources existing before the position for inserting the third transaction resource in the first transaction resource queue is executed, or may be the state of the first to-be-operated resource after the transaction resource in the third position is executed, or may be the state of the first to-be-operated resource after a transaction resource in a position is executed if the third transaction resource is inserted into the position in the first transaction resource queue (execution of the transaction resource needs to ensure successful execution of the third transaction resource). Content of the state of the first to-be-operated resource is determined according to different cases.

In summary, all the foregoing five cases f, g, h, i, and j are cases in which the first managed object device determines, according to the third execution time and the state of the first to-be-operated resource, that the preset resource creation condition is met when the third execution time of the third transaction resource is updated to a time later than an execution time of any transaction resource in the first transaction resource queue.

Based on the foregoing embodiment shown in FIG. 3, in a third possible implementation manner of this embodiment of the present invention, this embodiment of the present invention is also applied to a scenario of processing concurrent transaction resources on a managed object device, that is, a scenario in which a transaction resource queue exists on the managed object device. This embodiment relates to a specific process in which the second managed object device creates the fourth transaction resource successfully in a second transaction resource queue. Referring to FIG. 5, the foregoing S204 may specifically include the following steps.

S401. The second managed object device determines that a second transaction resource queue exists on the second managed object device, where the second transaction resource queue includes at least one transaction resource.

Specifically, after receiving the fourth transaction resource creation request sent by the application server, the second managed object device determines whether the second transaction resource queue exists. The second transaction resource queue includes at least one transaction resource, and transaction resources in the second transaction resource queue are arranged according to an execution time of each transaction resource in the second transaction resource queue. If the second managed object device determines that no second transaction resource queue exists on the second managed object device, the second managed object device may perform execution according to the technical solution in Embodiment 1 shown in FIG. 1 or in the first possible implementation manner of the embodiment shown in FIG. 3. Details are not described again herein. If it is determined that the second transaction resource queue exists, step 402 is executed.

S402. The second managed object device determines, according to the fourth execution time and a state of the second to-be-operated resource of the second managed object device, that the fourth transaction resource meets the preset resource creation condition, and creates the fourth transaction resource.

Specifically, when the second managed object device determines that the second transaction resource queue exists, the second managed object device performs arrangement and comparison according to the fourth execution time in the fourth transaction resource creation request and the execution time of each transaction resource in the second transaction resource queue, and determines a position for inserting the fourth transaction resource in the second transaction resource queue. It should be noted that, the second managed object device currently has not created the fourth transaction resource successfully. Herein the fourth transaction resource is a to-be-created transaction resource.

Further, the second managed object device determines, according to the fourth execution time and the state of the second to-be-operated resource, that the fourth transaction resource meets the preset resource creation condition, creates the fourth transaction resource, and sends the response indicative of successful creation of the fourth transaction resource to the application server, where the response carries the identifier of the fourth transaction resource. Specifically, the following two cases C and D may be included.

C. When one transaction resource included in the second transaction resource queue is in the reserved state, and a transaction resource located at a first position in the second transaction resource queue is in the reserved state, the second managed object device determines, according to the fourth execution time and the state of the second to-be-operated resource, that the fourth transaction resource meets the preset resource creation condition, and creates the fourth transaction resource. Specifically, the following two cases k and l may be included. It should be noted that, for details about the preset resource creation condition, refer to the determining conditions described in k and l.

k. If it is determined, according to the fourth execution time, that transaction resources in the second transaction resource queue exist both before and after the position for inserting the fourth transaction resource in the second transaction resource queue, the second managed object device determines, according to the state of the second to-be-operated resource after the transaction resource at the first position is executed, whether the fourth transaction resource can be executed successfully, where the first position is a previous position adjacent to the position for inserting the fourth transaction resource in the second transaction resource queue.

If the second managed object device determines, according to the state of the second to-be-operated resource after the transaction resource at the first position is executed, that the fourth transaction resource can be executed successfully, and determines, according to the state of the second to-be-operated resource after the fourth transaction resource is executed, that a transaction resource at a second position in the second transaction resource queue can also be executed successfully (the second position is a next position adjacent to the position for inserting the fourth transaction resource in the second transaction resource queue), the second managed object device determines that the fourth transaction resource is created successfully, and sends the response indicative of successful creation of the fourth transaction resource of the second transaction to the application server, where a state of the fourth transaction resource carried in the response is the semi-reserved state, and the response carries the identifier of the fourth transaction resource.

Optionally, after the fourth transaction resource is created successfully, and when the fourth execution time arrives, the second managed object device executes the fourth to-be-executed operation included in the fourth transaction resource, deletes the executed fourth transaction resource from the queue, switches the next transaction resource (namely, the transaction resource at the second position) from the semi-reserved state to the reserved state, and notifies the application server that the transaction resource at the second position has been switched to the reserved state.

As described above, in the case k, the state of the second to-be-operated resource may be the state of the second to-be-operated resource after the transaction resource at the first position is executed, or may be the state of the second to-be-operated resource after the fourth transaction resource is executed. Content of the state of the second to-be-operated resource is determined according to different cases.

l. If it is determined, according to the fourth execution time, that a transaction resource in the second transaction resource queue exists before the position for inserting the fourth transaction resource in the second transaction resource queue, and that no transaction resource in the second transaction resource queue exists after the inserting position, when the second managed object device determines, according to the state of the second to-be-operated resource after the transaction resource at the first position is executed, that the fourth transaction resource can be executed successfully, the second managed object device determines that the fourth transaction resource is created successfully, and sends the response indicative of successful creation of the fourth transaction resource of the second transaction to the application server, where the state of the fourth transaction resource carried in the response is the semi-reserved state, and the response carries the identifier of the fourth transaction resource.

As described above, in the case l, the state of the second to-be-operated resource may be the state of the second to-be-operated resource after the transaction resource at the first position is executed.

D. When at least two transaction resources included in the second transaction resource queue are in the reserved state, the second managed object device determines, according to the fourth execution time and the state of the second to-be-operated resource, that the fourth transaction resource meets the preset resource creation condition, and creates the fourth transaction resource. Specifically, the following three cases m, n, and p may be included. It should be noted that, for details about the preset resource creation condition, refer to the determining conditions described in m, n, and p.

m. If the second managed object device determines, according to the state of the second to-be-operated resource after the fourth transaction resource is executed, that any other transaction resource in the reserved state after the position for inserting the fourth transaction resource in the second transaction resource queue can be executed successfully, and the second managed object device determines that no other transaction resource in the second transaction resource queue exists before the inserting position, the second managed object device determines that the fourth transaction resource is created successfully, and sends the response indicative of successful creation of the fourth transaction resource of the second transaction to the application server, where the state of the fourth transaction resource carried in the response is the reserved state, and the response carries the identifier of the fourth transaction resource.

As described above, in the case m, the state of the second to-be-operated resource may be the state of the second to-be-operated resource after the fourth transaction resource is executed.

n. If the second managed object device determines, according to the state of the second to-be-operated resource after the fourth transaction resource is executed, that any other transaction resource in the reserved state in the second transaction resource queue after the position for inserting the fourth transaction resource in the second transaction resource queue can be executed successfully, and the second managed object device determines that another transaction resource in the second transaction resource queue exists before the inserting position, the second managed object device further determines, according to the state of the second to-be-operated resource after any transaction resource in the other transaction resources existing before the inserting position in the second transaction resource queue is executed, whether the fourth transaction resource can be executed successfully; if yes, the second managed object device determines that the fourth transaction resource is created successfully, and sends the response indicative of successful creation of the fourth transaction resource of the second transaction to the application server, where the state of the fourth transaction resource carried in the response is the reserved state, and the response carries the identifier of the fourth transaction resource.

As described above, in the case n, the state of the second to-be-operated resource may be the state of the second to-be-operated resource after the fourth transaction resource is executed, or may be the state of the second to-be-operated resource after any transaction resource in the other transaction resources existing before the position for inserting the fourth transaction resource in the second transaction resource queue is executed. Content of the state of the second to-be-operated resource is determined according to different cases.

p. If the second managed object device determines, according to the state of the second to-be-operated resource after the fourth transaction resource is executed, that any other transaction resource in the reserved state in the second transaction resource queue after the position for inserting the fourth transaction resource in the second transaction resource queue can be executed successfully, and the second managed object device determines that another transaction resource in the second transaction resource queue exists before the inserting position, the second managed object device further determines, according to the state of the second to-be-operated resource after any transaction resource in the transaction resources existing before the inserting position in the second transaction resource queue is executed, whether the fourth transaction resource can be executed successfully; if not (that is, the second managed object device determines, according to the status of the second to-be-operated resource after any transaction resource in the transaction resources existing before the inserting position in the second transaction resource queue is executed, that the fourth transaction resource cannot be executed successfully), the second managed object device further determines, according to the state of the second to-be-operated resource after the transaction resource at the first position is executed, whether the fourth transaction resource can be executed successfully. If the second managed object device determines, according to the state of the second to-be-operated resource after the transaction resource at the first position is executed, that the fourth transaction resource can be executed successfully, the second managed object device determines that the fourth transaction resource is created successfully, and sends the response indicative of successful creation of the fourth transaction resource of the second transaction to the application server, where the state of the fourth transaction resource carried in the response is the semi-reserved state, and the response carries the identifier of the fourth transaction resource.

As described above, in the case p, the state of the second to-be-operated resource may be the state of the second to-be-operated resource after the fourth transaction resource is executed, or may be the state of the second to-be-operated resource after any transaction resource in the other transaction resources existing before the position for inserting the fourth transaction resource in the second transaction resource queue is executed, or may be the state of the second to-be-operated resource after the transaction resource at the first position is executed. Content of the state of the second to-be-operated resource is determined according to different cases.

In summary, all the foregoing five cases k, l, m, n, and p are cases in which the second managed object device determines, according to the fourth execution time and the state of the second to-be-operated resource, that the fourth transaction resource meets the preset resource creation condition.

Based on the foregoing embodiment shown in FIG. 3, in a fourth possible implementation manner of this embodiment of the present invention, this embodiment relates to a specific process in which when the processing request received by the second managed object device for the fourth transaction resource of the second transaction is an update request that carries the identifier of the fourth transaction resource and the updated third execution time, the second managed object device processes the fourth transaction resource according to the update request. the foregoing S206 specifically includes: the second managed object device successfully updates the fourth transaction resource according to the updated third execution time, and after the update succeeds, returns an update success response message to the application server; or fails to update the fourth transaction resource according to the updated third execution time, and returns an update failure response message to the application server.

Specifically, after receiving the update request, the second managed object device processes the fourth transaction resource successfully created by the second managed object device. The following two cases q and s may be included.

q. When the second managed object device determines that no second transaction resource queue exists on the second managed object device, that is, the second to-be-operated resource on the second managed object device is currently not associated with a transaction resource of another transaction, but is associated with the fourth transaction resource only, the second managed object device determines whether the updated third execution time does not comply with content of the foregoing (4), that is, the second managed object device determines whether the updated third execution time falls within a sleep period of the second managed object device; if the updated third execution time is still a working time of the second managed object device, the second managed object device directly updates the fourth execution time of the successfully created fourth transaction resource to the updated third execution time, and sends the update success response message to the application server. If the updated third execution time is still a sleep time of the second managed object device, the second managed object device determines that the fourth transaction resource fails to be updated, and sends the update failure response message to the application server.

r. When the second managed object device determines that the second transaction resource queue exists on the second managed object device, the second managed object device deletes, after receiving the update request that carries the updated third execution time, the previously successfully created fourth transaction resource from the second transaction resource queue, and then uses the updated third execution time as an execution time of a new fourth transaction resource; the second managed object device determines, according to the execution time of the new fourth transaction resource and the state of the corresponding second to-be-operated resource, that the new fourth transaction resource meets the preset resource creation condition, creates the new fourth transaction resource according to the updated third execution time, and sends the update success response to the application server. That is, when the second managed object device determines that the second transaction resource queue exists on the second managed object device, an operation performed by the second managed object device after the update request is received is actually an operation of creating a new transaction resource again. For a specific execution process, refer to the specific solutions described in the foregoing a to r.

If the second managed object device successfully updates the fourth execution time of the fourth transaction resource to the updated third execution time according to the update request, and the first managed object device successfully creates a new third transaction resource according to the updated third execution time carried in the new third transaction resource creation request (in addition, states of the transaction resources carried in the responses that are sent by the first managed object device and the second managed object device to the application server about successful creation of the transaction resources of the second transaction are both the reserved state), and before the updated third execution time arrives, the application server does not send any processing request, when the updated third execution time arrives, the first managed object device and the second managed object device simultaneously execute the operations to be executed by the devices.

Based on the foregoing embodiment shown in FIG. 3, in a fifth possible implementation manner of this embodiment of the present invention, this embodiment relates to a specific process in which when the processing request received by the second managed object device for the fourth transaction resource of the second transaction is a deletion request that carries the identifier of the fourth transaction resource, the second managed object device processes the fourth transaction resource according to the deletion request. As shown in FIG. 6, the foregoing S206 specifically includes:

S501. The second managed object device deletes the fourth transaction resource on the second managed object device according to the identifier of the fourth transaction resource.

S502. The second managed object device sends a deletion response to the application server.

Specifically, the following two cases s and t may be included.

s. When one transaction resource in the second transaction resource queue is in the reserved state, after the second managed object device deletes the fourth transaction resource, the second managed object device executes a determining operation and obtains a determining result. The determining operation includes: the second managed object device determines, according to the state of the second to-be-operated resource after the transaction resource at the first position in the second transaction resource queue is executed, whether the transaction resource at the second position can be executed successfully (that is, the second managed object device determines, according to the state of the second to-be-operated resource after the transaction resource at the first position in the second transaction resource queue is executed, whether the transaction resource at the second position can enter the reserved state); the first position is a previous position adjacent to the position for inserting the fourth transaction resource in the second transaction resource queue, and the second position is a next position adjacent to the position for inserting the fourth transaction resource in the second transaction resource queue.

After the second managed object device deletes the fourth transaction resource, if the second managed object device determines, according to the state of the second to-be-operated resource after the transaction resource at the first position in the second transaction resource queue is executed, that the transaction resource at the second position is executed successfully, the second managed object device sends a first deletion response to the application server, updates the state of the transaction resource at the second position to the reserved state after the transaction resource at the first position is executed, and notifies the application server that the transaction resource at the second position is already in the reserved state.

After the second managed object device deletes the fourth transaction resource, if the second managed object device determines, according to the state of the second to-be-operated resource after the transaction resource at the first position in the second transaction resource queue is executed, that the transaction resource at the second position fails to be executed, the second managed object device deletes the transaction resource at the second position, and notifies the application server that the transaction resource at the second position has been deleted. The second managed object device further determines whether the deleted transaction resource at the second position is a last transaction resource in the second transaction resource queue. If it is determined that the transaction resource at the second position is not the last transaction resource in the second transaction resource queue, the second managed object device uses a position next to the second position as a new second position, and executes the foregoing determining operation on a transaction resource at the new second position. If it is determined that the transaction resource at the second position is the last transaction resource in the second transaction resource queue, the transaction resource deletion procedure is terminated.

Herein a simple example may be used for description. It is assumed that the second transaction resource queue includes four transaction resources, namely, T1, T2, T3, and T4. The fourth transaction resource is inserted between T1 and T2, and it is assumed that the fourth transaction resource is T5. T1 is in the reserved state, but T2, T3, and T4 are at the semi-reserved state, as shown in Table 1.

TABLE 1

| Second transaction resource queue | | | | |
| --- | --- | --- | --- | --- |
| T1 | T5 | T2 | T3 | T4 |
| Reserved | Semi-reserved | Semi-reserved | Semi-reserved | Semi-reserved |

After the second managed object device deletes T5 from the second transaction resource queue, the second managed object device needs to determine, according to the state of the second to-be-operated resource after the transaction resource at the first position in the second transaction resource queue is executed, whether the transaction resource at the second position can be switched to the reserved state, that is, the second managed object device needs to determine, according to the state of the second to-be-operated resource after T1 previous to T5 is executed, whether T2 can be switched to the reserved state. If yes, the second managed object device sends a first deletion response to the application server, updates the state of T2 to the reserved state after T1 is executed, and notifies the application server that T2 is already in the reserved state. If not, the second managed object device also needs to delete T2, and notify the application server that T2 has been deleted. Further, the second managed object device also needs to determine whether the deleted T2 is a last transaction resource in the second transaction resource queue. If it is determined that T2 is not the last transaction resource in the second transaction resource queue, the second managed object device continues to determine, according to the state of the second to-be-operated resource after T1 is executed (in this case, T5 and T2 have been deleted), whether T3 can be switched to the reserved state; if yes, the second managed object device sends a first deletion response to the application server, updates the state of T3 to the reserved state after T1 is executed, and notifies the application server that T3 is already in the reserved state; if not, the second managed object device also needs to delete T3, and notify the application server that T3 has been deleted. Further, the second managed object device also needs to determine whether the deleted T3 is the last transaction resource in the second transaction resource, and so on, until it is determined that the deleted transaction resource is the last transaction resource in the second transaction resource queue, and then the deletion procedure is terminated.

t. If at least two transaction resources in the second transaction resource queue are in the reserved state, after the second managed object device deletes the fourth transaction resource, the second managed object device determines whether a transaction resource in the semi-reserved state in the second transaction resource queue meets a preset deletion condition.

After the second managed object device deletes the fourth transaction resource, if the second managed object device determines, according to the state of the second to-be-operated resource after the fourth transaction resource is deleted, that the transaction resource in the semi-reserved state in the second transaction resource queue meets the preset deletion condition, that is, after the fourth transaction resource is deleted, the second managed object device determines, according to the status of the second to-be-operated resource after the fourth transaction resource is deleted (that is, after the fourth transaction resource is deleted, the second managed object device determines, according to the status of the second to-be-operated resource after any transaction resource previous to the transaction resource in the semi-reserved state is executed), that the transaction resource in the semi-reserved state in the second transaction resource queue cannot be executed successfully, the second managed object device deletes the transaction resource in the semi-reserved state, and sends a second deletion response to the application server, so as to notify the application server that the transaction resource has been deleted.

Herein a simple example may be used for description. It is assumed that the second transaction resource queue includes four transaction resources, namely, T1, T2, T3, and T4. The foregoing T1, T2, and T4 are all in the reserved state, T3 is in the semi-reserved state, and it is assumed that T2 is the fourth transaction resource, as shown in Table 2.

TABLE 2

| T1 | T2 | T3 | T4 |
|---|---|---|---|
| Reserved | Reserved | Semi-reserved | Reserved |

After the fourth transaction resource T2 is deleted, the second managed object device determines whether T3 can be switched to the reserved state. Whether T3 can be executed successfully depends only on the state of the second to-be-operated resource after T2 is executed (T3 is in the semi-reserved state because when T3 is created, it is determined that any transaction resource in the reserved state after T3 in the queue can be executed successfully based on the state of the second to-be-operated resource after T3 is executed, and it is also determined that T1 and T2 exist before T3, and that T3 can be committed based on the state of the second to-be-operated resource after T2 is executed, but T3 cannot be committed based on the state of the second to-be-operated resource after T1 is executed; therefore, T3 is created, and it is determined that the state of T3 is the semi-reserved state). Therefore, successful execution of T3 depends only on the state of the second to-be-operated resource after T2 is executed, and T3 also cannot be executed successfully after T2 is deleted. Therefore, the second managed object device also needs to delete T3, and send a second deletion response to the application server, so as to notify the application server that the transaction resource has been deleted.

After the second managed object device deletes the fourth transaction resource, if the second managed object device determines, according to the state of the second to-be-operated resource after the fourth transaction resource is deleted, that the transaction resource in the semi-reserved state in the second transaction resource queue does not meet the preset deletion condition, that is, after the fourth transaction resource is deleted, based on the state of the second to-be-operated resource after the fourth transaction resource is deleted (that is, after the fourth transaction resource is deleted, based on the state of the second to-be-operated resource after any transaction resource previous to that in the semi-reserved state is executed), the transaction resource in the semi-reserved state can be executed successfully, the second managed object device updates the transaction resource in the semi-reserved state to the reserved state.

Herein a simple example is also used for description. It is assumed that the second transaction resource queue includes four transaction resources, namely, T1, T2, T3, and T4. The foregoing T1, T2, and T4 are all in the reserved state, T3 is in the semi-reserved state, and it is assumed that T1 is the fourth transaction resource, as shown in Table 3.

TABLE 3

| T1 | T2 | T3 | T4 |
|---|---|---|---|
| Reserved | Reserved | Semi-reserved | Reserved |

After the fourth transaction resource T1 is deleted, the second managed object device determines whether T3 can be switched to the reserved state. Whether T3 can be switched to the reserved state depends only on the state of the second to-be-operated resource after T2 is executed. Therefore, after T1 is deleted, the semi-reserved state of T3 is not affected, that is, the second managed object device determines, according to the status of the second to-be-operated resource after T2 is executed, that T3 can be executed successfully. Therefore, the second managed object device further determines, according to the state of the second to-be-operated resource after any transaction resource previous to T3 is executed, that T3 can be executed successfully (in this example, only T2 remains after T1 is deleted, and therefore, for T3, refer to only the state of the second to-be-operated resource after T2 is executed). In this case, after T2 is executed, the second managed object device updates T3 to the reserved state.

It should be noted that, in the fourth possible implementation manner and the fifth possible implementation manner of the embodiment shown in FIG. 3, if the second managed object device executes a deletion request or an update request, execution of a transaction resource in the reserved state is affected. This means that if the deletion request or the update request is executed, an original executable state of the transaction resource is destructed, and further, atomicity of the transaction is destructed. Therefore, the second managed object device rejects the deletion request or the update request in this case.

To better describe the technical solution of this application, the following uses two examples of intelligent irrigation for specific description. An example 1 mainly relates to a scenario in which a second transaction resource queue includes one transaction resource in a reserved state. An example 2 mainly relates to a scenario in which a second transaction resource queue includes at least two transaction resources in a reserved state:

Example 1

This scenario relates to a process of processing concurrent transactions, and a second transaction resource queue on a managed object device includes one transaction resource in a reserved state. The application server has six transactions in total, which are respectively a transaction 1, a transaction 2, a transaction 3, a transaction 4, a transaction 5, and a transaction 6. The transactions relate to three managed object devices, which are respectively a first managed object device A (a valve 1), a second managed object device (a valve 2), and a first managed object device B (a valve 3). For the transaction 1, the application server sends a fourth transaction resource creation request T1 to the valve 2, and sends a third transaction resource creation request R1 to the valve 1 and valve 3; for the transaction 2, the application server sends a fourth transaction resource creation request T2 to the valve 2, and sends a third transaction resource creation request R2 to the valve 1 and the valve 3; for the transaction 3, the application server sends a fourth transaction resource creation request T3 to the valve 2, and sends a third transaction resource creation request R4 to the valve 1 and the valve 3; for the transaction 4, the application server sends a fourth transaction resource creation request T4 to the valve 2, and sends a third transaction resource creation request R4 to the valve 1 and the valve 3; for the transaction 5, the application server sends a fourth transaction resource creation request T5 to the valve 2, and sends a third transaction resource creation request R5 to the valve 1 and the valve 3; and for the transaction 6, the application server sends a fourth transaction resource creation request T6 to the valve 2, and sends a third transaction resource creation request R6 to the valve 1 and the valve 3. The following describes only an operation on the second managed object device (namely, the valve 2). For operations on the valve 1 and the valve 3, refer to the operation on the valve 2.

It should be noted that, the application server sends the T1 request, the T2 request, the T3 request, the T4 request, the T5 request, and the T6 request to the valve 2 in sequence in an order of transactions.

A fourth transaction resource to be created according to the T1 request is t1, a fourth transaction resource to be created according to the T2 request is t2, a fourth transaction resource to be created according to the T3 request is t3, a fourth transaction resource to be created according to the T4 request is t4, a fourth transaction resource to be created according to the T5 request is t5, and a fourth transaction resource to be created according to the T6 request is t6. The following describes only an operation on the second managed object device (namely, the valve 2). For operations on the valve 1 and the valve 3, refer to the operation on the valve 2.

For the transaction 1, the application server sends the T1 request to the valve 2, requesting to adjust the valve 2 to 30% at 12:00. After receiving the T1 request, the valve 2 checks that no second transaction resource exists on the valve 2 in this case. The valve 2 further determines, based on a state of a second to-be-operated resource in this case, that a fourth transaction resource t1 can be created successfully, and therefore creates t1, where t1 is in the reserved state. The valve 2 returns a response indicative of successful creation of the fourth transaction resource to the application server. In this case, the second transaction resource queue for the second to-be-operated resource on the valve 2 is shown in Table 4. After t1 is created successfully, t1 becomes a transaction resource in the second transaction resource queue.

TABLE 4

| t1 |
| --- |
| 30% |
| 12:00 |
| Reserved |

For the transaction 2, the application server sends the T2 request to the valve 2, requesting to adjust the valve 2 to 40% at 12:5. After receiving the T2 request, the valve 2 confirms that the second transaction resource queue for the second to-be-operated resource exists on the valve 2, and that the second transaction resource queue includes t1. The valve 2 determines, according to the execution time 12:5 required by the T2 request and the execution time 12:00 of t1 in the second transaction resource queue, that a fourth transaction resource t2 to be created according to the T2 request should be created in a last position in the second transaction resource queue. The valve 2 further confirms and determines, based on the state of the second to-be-operated resource after t1 is executed, that t2 may be switched to the reserved state. Therefore, the valve 2 successfully creates t2, and a current state of t2 is a semi-reserved state. The valve 2 returns a response indicative of successful creation of the fourth transaction resource to the application server. In this case, the second transaction resource queue for the second to-be-operated resource on the valve 2 is shown in Table 5. In addition, after t2 is created successfully, t2 becomes a transaction resource in the second transaction resource queue.

TABLE 5

| t1 | t2 |
| --- | --- |
| 30% | 40% |
| 12:00 | 12:05 |
| Reserved | Semi-reserved |

For the transaction 3, the application server sends the T3 request to the valve 2, requesting to adjust the valve 2 to 20% at 12:03. After receiving the T3 request, the valve 2 confirms that the second transaction resource queue for the second to-be-operated resource exists on the valve 2, and that the second transaction resource queue includes t1 and t2. The valve 2 determines, according to the execution time 12:03 required by the T3 request, the execution time 12:00 of t1 in the second transaction resource queue, and the execution time 12:5 of t2, that a fourth transaction resource t3 to be created according to the T3 request should be created between t1 and t2. The valve 2 further confirms and determines, based on the state of the second to-be-operated resource after t1 is executed (in this case, the state of the second to-be-operated resource is that an opening degree of the valve 2 is 30%), that t3 may be switched to the reserved state (that is, the valve 2 determines that the valve 2 may be adjusted from 30% to 20%, where an adjustment range is within a preset threshold range, assuming that the preset threshold is 60%), and determines, based on the state of the second to-be-operated resource after t3 is executed (in this case, the state of the second to-be-operated resource is that an opening degree of the valve 2 is 20%), that t2 may also be switched to the reserved state (that is, the valve 2 determines that the valve 2 may be adjusted from 20% to 40%, where an adjustment range is within the preset threshold range). Therefore, the valve 2 creates t3 successfully, and a current state of t3 is a semi-reserved state. The valve 2 returns a response indicative of successful creation of the fourth transaction resource to the application server. In this case, the second transaction resource queue for the second to-be-operated resource on the valve 2 is shown in Table 6. In addition, after t3 is created successfully, t3 becomes a transaction resource in the second transaction resource queue.

TABLE 6

| t1 | t3 | t2 |
|---|---|---|
| 30% | 20% | 40% |
| 12:00 | 12:03 | 12:05 |
| Reserved | Semi-reserved | Semi-reserved |

For the transaction 4, the application server sends the T4 request to the valve 2, requesting to adjust the valve 2 to 20% at 11:55. After receiving the T4 request, the valve 2 confirms that the second transaction resource queue for the second to-be-operated resource exists on the valve 2, and that the second transaction resource queue includes t1, t2, and t3. The valve 2 determines, according to the execution time 11:55 required by the T4 request and the execution time 12:00 of t1 in the queue, that a fourth transaction resource t4 to be created according to the T4 request should be created before t1, namely, a first position in the second transaction resource queue. Because t1 is already in the reserved state, if another transaction resource is created before t1, the reserved transaction resource t1 cannot be executed (an M2M system does not allow this possibility to exist). However, the valve 2 checks that if an execution time of t4 is set to be later than 12:5, that is, if t4 is created after t2, based on the state of the second to-be-operated resource after t2 is executed (the state of the second to-be-operated resource after t2 is executed is 40%), t4 can be executed successfully (that is, the valve 2 determines that the valve 2 may be adjusted from 40% to 20%, where an adjustment range is within the preset threshold range). Therefore, the valve 2 returns a second failure response to the application server, but the response carries an appropriate execution time 12:10. In this case, the second transaction resource queue for the second to-be-operated resource on the valve 2 is still shown in Table 6.

For the transaction 5, the application server sends the T5 request to the valve 2, requesting to adjust the valve 2 to 80% at 12:02. After receiving the T5 request, the valve 2 confirms that the second transaction resource queue for the second to-be-operated resource exists on the valve 2, and that the second transaction resource queue includes t1, t2, and t3. The valve 2 determines, according to the execution time 12:02 required by the T5 request, the execution time 12:00 of t1 in the queue, and the execution time 12:03 of t3, that t5 should be created between t1 and t2 in the transaction resource queue. However, if t5 is executed successfully, the opening degree of the valve is 80% (that is, in this case, the state of the second to-be-operated resource on the valve 2 is 80%), but t3 requests to adjust the opening degree of the valve 2 to 20% at this time (that is, adjust the valve 2 from 80% to 20%), for self-protection, the valve 2 does not allow a growth range between two adjustments to be greater than or equal to a preset threshold (assuming 60%), because if the growth range of the valve 2 is equal to 60%, great impact is caused to subsequent flexible pipes and interfaces, resulting in a phenomenon of water leakage or joint loosening. Therefore, the valve 2 determines that after t5 is executed, t3 in the semi-reserved state is affected and cannot enter the reserved state. Therefore, the valve 2 returns a second failure response to the application server. However, likewise, the valve 2 checks that, if t5 is created after t2, t5 can be created successfully. Therefore, the second failure response carries an appropriate execution time 12:10. In this case, the second transaction resource queue for the second to-be-operated resource on the valve 2 is still shown in Table 6.

For the transaction 6, the application server sends the T6 request to the valve 2, requesting to adjust the valve 2 to 100% at 12:08. After receiving the T6 request, the valve 2 confirms that the second transaction resource queue for the second to-be-operated resource exists on the valve 2, and that the second transaction resource queue includes t1, t2, and t3. The valve 2 determines, according to the execution time 12:08 required by the T6 request and the execution time 12:5 of t2 in the queue, that t6 should be created after t2 in the second transaction resource queue, namely, the last position in the second transaction resource queue. However, after t2 is executed successfully, the opening degree of the valve 2 is 40% (that is, in this case, the state of the second to-be-operated resource on the valve 2 is 40%), but t6 requests to adjust the opening degree of the valve 2 to 100% at this time. Therefore, a growth range of the valve is equal to the preset threshold (assuming 60%). Therefore, the valve 2 determines that after t2 is executed, t6 cannot enter the reserved state, and at the same time, the valve 2 checks that a 100% adjustment of t6 is not appropriate anywhere in the second transaction resource queue, and therefore returns a first failure response.

For deletion of a transaction resource in the transaction 1 (one transaction includes multiple transaction resources, the multiple transaction resources are created by different managed object devices respectively, and t1, t2, and t3 in the foregoing Table 6 are transaction resources that belong to different transactions), in the transaction 1, the application server sends a fourth transaction resource creation request to the valve 2, and a fourth transaction resource is created successfully on the valve 2, where the fourth transaction resource is assumed to be the foregoing t1. In addition, the application server receives a response sent by the valve 1 about unsuccessful creation of a third transaction resource. This indicates that the third transaction resource of the transaction 1 cannot be created successfully on the valve 1. Therefore, the application server needs to delete t1 that has been created successfully on the valve 2. Therefore, the application server sends a deletion request that carries an identifier of t1 to the valve 2, so that the valve 2 receives, before the execution time of t1 arrives, the deletion request sent by the application server, where the deletion request is used to delete t1 in the second transaction resource queue. The valve 2 determines, according to the current second transaction resource queue, that deletion of t1 does not affect the semi-reserved state of t3. Because after t1 is deleted, the valve 2 is directly opened to 20% from full closing. Therefore, t3 can enter the reserved state. After t1 is executed, the valve 2 updates the state of t2 from the semi-reserved state to the reserved state, and notifies the application server that t2 has entered the reserved state.

For execution of a transaction resource in the transaction 2, the valve 2 confirms that no deletion request for deleting t2 of the transaction 2 or no update request sent by the application server is received. After 12:5 arrives, the valve 2 executes a to-be-operated operation in t2, that is, adjusting the opening degree of the valve to 40%. Then, the valve removes t2 from the second transaction resource queue. In this case, if another transaction resource Tx exists after t2 in the second transaction resource queue, the valve 2 switches the state of Tx from the semi-reserved state to the reserved state, and sends a notification to the application server, notifying that Tx has entered the reserved state.

The example 1 is intended for a scenario in which the second transaction resource queue includes one transaction resource in the reserved state, and describes a process of processing concurrent transactions by the application server and the second managed object device, and a technical solution to maintaining the second transaction resource queue of the second managed object device during the processing.

Example 2

This scenario relates to a process of processing concurrent transactions, and a second transaction resource queue on a managed object device includes at least two transaction resources in a reserved state. The application server has six transactions in total, which are respectively a transaction 1, a transaction 2, a transaction 3, a transaction 4, a transaction 5, and a transaction 6. The transactions relate to three managed object devices, which are respectively a first managed object device A (a valve 1), a second managed object device (a valve 2), and a first managed object device B (a valve 3). For the transaction 1, the application server sends a fourth transaction resource creation request T1 to the valve 2, and sends a third transaction resource creation request R1 to the valve 1 and valve 3; for the transaction 2, the application server sends a fourth transaction resource creation request T2 to the valve 2, and sends a third transaction resource creation request R2 to the valve 1 and the valve 3; for the transaction 3, the application server sends a fourth transaction resource creation request T3 to the valve 2, and sends a third transaction resource creation request R4 to the valve 1 and the valve 3; for the transaction 4, the application server sends a fourth transaction resource creation request T4 to the valve 2, and sends a third transaction resource creation request R4 to the valve 1 and the valve 3; for the transaction 5, the application server sends a fourth transaction resource creation request T5 to the valve 2, and sends a third transaction resource creation request R5 to the valve 1 and the valve 3; and for the transaction 6, the application server sends a fourth transaction resource creation request T6 to the valve 2, and sends a third transaction resource creation request R6 to the valve 1 and the valve 3. The following describes only an operation on the second managed object device (namely, the valve 2). For operations on the valve 1 and the valve 3, refer to the operation on the valve 1.

It should be noted that, the application server sends the T1 request, the T2 request, the T3 request, the T4 request, the T5 request, and the T6 request to the valve 2 in sequence in an order of transactions. It is assumed that the application server sends the T1 request, the T2 request, the T3 request, the T4 request, the T5 request, and the T6 request to the valve 2 in sequence.

A fourth transaction resource to be created according to the T1 request is t1, a fourth transaction resource to be created according to the T2 request is t2, a fourth transaction resource to be created according to the T3 request is t3, a fourth transaction resource to be created according to the T4 request is t4, a fourth transaction resource to be created according to the T5 request is t5, and a fourth transaction resource to be created according to the T6 request is t6. The following describes only an operation on the second managed object device (namely, the valve 2). For operations on the valve 1 and the valve 3, refer to the operation on the valve 2. It should be noted that, an initial state of the valve 2 is 25%.

For the transaction 1, the application server sends the T1 request to the valve 2, requesting to adjust the valve 2 to 40% at 12:00. After receiving the T1 request, the valve 2 checks that no second transaction resource for a second to-be-operated resource exists on the valve 2 in this case. The valve 2 further checks and determines, based on a state of the second to-be-operated resource in this case, that a fourth transaction resource t1 can be created successfully, and therefore creates t1, where t1 is in the reserved state. The valve 2 returns a response indicative of successful creation of the fourth transaction resource to the application server. In this case, the second transaction resource queue for the second to-be-operated resource on the valve 2 is shown in Table 7. After t1 is created successfully, t1 becomes a transaction resource in the second transaction resource queue.

TABLE 7

| t1 |
| --- |
| 40% |
| 12:00 |
| Reserved |

For the transaction 2, the application server sends the T2 request to the valve 2, requesting to adjust the valve 2 to 80% at 12:5. After receiving the T2 request, the valve 2 confirms that the second transaction resource queue for the second to-be-operated resource exists on the valve 2 in this case, and that the second transaction resource queue includes t1. The valve 2 determines, according to the execution time 12:5 required by the T2 request and the execution time 12:00 of t1 in the second transaction resource queue, that t2 to be created according to the T2 request should be created in a last position in the second transaction resource queue. Therefore, the valve 2 confirms that the fourth transaction resource t2 to be created does not affect the reserved state of another transaction resource after the position of the transaction resource t2 to be created in the second transaction resource queue. In the second transaction resource queue shown in the foregoing Table 7, t1 further exists before t2. The valve 2 confirms that, whether based on the state of the second to-be-operated resource after t1 is executed or based on a current state of the second to-be-operated resource after t1 is deleted (namely, the initial state 25% of the valve 2), t2 can enter the reserved state. Therefore, the valve 2 creates t2 successfully, and a current state of t2 is the reserved state. The valve 2 returns a response indicative of successful creation of the fourth transaction resource to the application server. In this case, the second transaction resource queue for the second to-be-operated resource on the valve 2 is shown in Table 8. After t2 is created successfully, t2 becomes a transaction resource in the second transaction resource queue.

TABLE 8

| t1 | t2 |
|---|---|
| 40% | 80% |
| 12:00 | 12:05 |
| Reserved | Reserved |

For the transaction 3, the application server sends the T3 request to the valve 2, requesting to adjust the valve 2 to 10% at 12:03. After receiving the T3 request, the valve 2 confirms that the second transaction resource queue for the second to-be-operated resource exists on the valve 2, and that the second transaction resource queue includes t1 and t2. The valve 2 determines, according to the execution time 12:03 required by the T3 request, the execution time 12:00 of t1 in the queue, and the execution time 12:5 of t2, that t3 is located between t1 and t2. In addition, successful creation of t3 may cause an adjustment range of t2 of the valve 2 to increase from 10% (10% of t3) to 80% (80% of t2) directly. This exceeds a limit that one adjustment of the valve 2 should not exceed 60%. Therefore, the reserved state of the t2 is affected. Therefore, t3 fails to be created. If t3 is created before t1, t3 can be created successfully. Therefore, a first failure response is returned, where the response includes an appropriate execution time 11:59. In this case, the second transaction resource queue for the second to-be-operated resource on the valve 2 is still shown in Table 8.

For the transaction 4, the application server sends the T4 request to the valve 2, requesting to adjust the valve 2 to 30% at 11:55. After receiving the T4 request, the valve 2 confirms that the second transaction resource queue for the second to-be-operated resource exists on the valve 2, and that the second transaction resource queue includes t1 and t2. According to the execution time 11:55 required by the T4 request and the execution time 12:00 of t1 in the queue, the valve 2 determines that t4 should be created before t1 in the second transaction resource queue. Because t1 and t2 are already in the reserved state, the valve 2 determines that, if t4 is created successfully, valve opening to 30% (that is, the state of the second to-be-operated resource after t4 is executed is 30%) does not affect normal execution of t1 and t2, and that no other transaction resource exists before t4 in the second transaction resource queue. Therefore, the valve 2 returns a response indicative of successful creation of the fourth transaction resource to the application server, where t4 is in the reserved state. In this case, the second transaction resource queue for the second to-be-operated resource on the valve 2 is shown in Table 9. After t4 is created successfully, t4 becomes a transaction resource in the second transaction resource queue.

TABLE 9

| t4 | t1 | t2 |
|---|---|---|
| 30% | 40% | 80% |
| 11:55 | 12:00 | 12:05 |
| Reserved | Reserved | Reserved |

For the transaction 5, the application server sends the T5 request to the valve 2, requesting to adjust the valve 2 to 100% at 12:02. After receiving the T5 request, the valve 2 confirms that the second transaction resource queue for the second to-be-operated resource exists on the valve 2, and that the second transaction resource queue includes t1, t2, and t4. The valve 2 determines, according to the execution time 12:02 required by the T5 request, the execution time 12:00 of t1 in the queue, and the execution time 12:5 of t2, that t5 should be created between t1 and t2 in the second transaction resource queue. Successful creation of t5 does not affect the reserved state of t2. However, t4 and t1 also exist before t5. Whether based on the state of the to-be-operated resource after t4 is executed or based on that after t1 is executed, t5 cannot be created successfully. For either 30% of t4 or 40% of t1, the 100% adjustment exceeds the limit 60%. Therefore, t5 fails to be created. However, the valve 2 checks that if t5 is created after t2, t5 can be created successfully. Therefore, a second failure response is returned, where the response includes an appropriate execution time 12:10. In this case, the second transaction resource queue for the second to-be-operated resource on the valve 2 is still shown in Table 9.

For the transaction 6, the application server sends the T6 request to the valve 2, requesting to adjust the valve 2 to 90% at 12:02. After receiving the T6 request, the valve 2 confirms that the second transaction resource queue for the second to-be-operated resource exists on the valve 2, and that the second transaction resource queue includes t1, t2, and t4. The valve 2 determines, according to the execution time 12:02 required by the T6 request, the execution time 12:00 of t1 in the queue, and the execution time 12:5 of t2, that t6 should be created between t1 and t2 in the second transaction resource queue. Successful creation of t6 does not affect the reserved state of t2. However, t4 and t1 also exist before t6. Based on a result after t1 is executed, t6 can be executed. However, based on a result after t4 is executed, t6 cannot be created successfully. For 30% of t4, the 90% adjustment exceeds the limit 60%. Therefore, although t6 is created successfully, t6 is in a semi-reserved state, and the valve 2 returns a response indicative of successful creation of the fourth transaction resource to the application server. In this case, the second transaction resource queue for the second to-be-operated resource on the valve 2 is shown in Table 10. After t6 is created successfully, t6 becomes a transaction resource in the second transaction resource queue, and t6 is in the semi-reserved state.

TABLE 10

| t4 | t1 | t6 | t2 |
|---|---|---|---|
| 30% | 40% | 90% | 80% |
| 11:55 | 12:00 | 12:02 | 12:05 |
| Reserved | Reserved | Semi-reserved | Reserved |

For execution of the transaction resource t4, when 11:55 arrives, the valve 2 executes a to-be-executed operation in t4, that is, the valve 2 is switched to 30% opening, and then t4 is deleted (that is, the state of the second to-be-operated resource is 30% in this case). The current second transaction resource queue is shown in the following Table 11.

TABLE 11

| t1 | t6 | t2 |
|---|---|---|
| 40% | 90% | 80% |
| 12:00 | 12:02 | 12:05 |
| Reserved | Semi-reserved | Reserved |

For deletion of the transaction resource t1, in the transaction 1, the application server sends a fourth transaction resource creation request T1 to the valve 2, and the valve 2 successfully creates t1 in the second transaction resource queue. In addition, the application server receives a response indicative of unsuccessful creation of a third transaction resource from the valve 1, and this indicates that the third transaction resource of the transaction 1 cannot be created successfully on the valve 1. Therefore, the application server needs to delete t1 that has been created successfully on the valve 2. Therefore, the application server sends a deletion request that carries an identifier of t1 to the valve 2, so that the valve 2 receives, before the execution time of t1 arrives, the deletion request sent by the application server, where the deletion request is used to delete t1 in the second transaction resource queue. The valve 2 determines, according to the current second transaction resource queue (referring to Table 11), that only t6 after t1 is in the semi-reserved state. The valve 2 determines whether deletion of t1 affects the semi-reserved state of t6. Because after t1 is deleted, the valve 2 determines, according to the current status of the second to-be-operated resource (30% opening), that t6 cannot enter the reserved state, the valve 2 deletes t6, and notifies the application server that t6 has been deleted.

For deletion of the transaction resource t4, in the second transaction resource queue shown in the foregoing Table 10, assuming that before t4 is executed, the valve 2 receives an update request requesting the valve 2 to be directly opened to 40%. After receiving the update request, the valve 2 is updated from the initial 25% state to 40%, where the adjustment range does not exceed a preset threshold, that is, the current state of the second to-be-operated resource is 40%.

If before 11:55, another valve related to t4 fails to create a third transaction resource that belongs to the transaction 4, t4 on the valve 2 also needs to be deleted. The valve 2 receives a deletion request sent by the application server, where the deletion request carries an identifier of t4 and is used to delete t4 in the second transaction resource queue. After the valve 2 deletes t4, only t6 after t4 is in the semi-reserved state according to the current second transaction resource queue. The valve 2 determines whether deletion of t4 affects the semi-reserved state of t6. After t4 is deleted, whether based on the current state (40% opening) of the second to-be-operated resource or based on the state (40% opening) after t1 is executed, t6 can enter the reserved state. Therefore, the valve 2 updates the state of t6 to reserved, and notifies the application server that t6 is already in the reserved state.

The example 2 is intended for a scenario in which the second transaction resource queue includes at least two transaction resources in the reserved state, and describes a process of processing concurrent transactions by the application server and the second managed object device, and a technical solution to maintaining the second transaction resource queue of the second managed object device during the processing.

Figure 7:
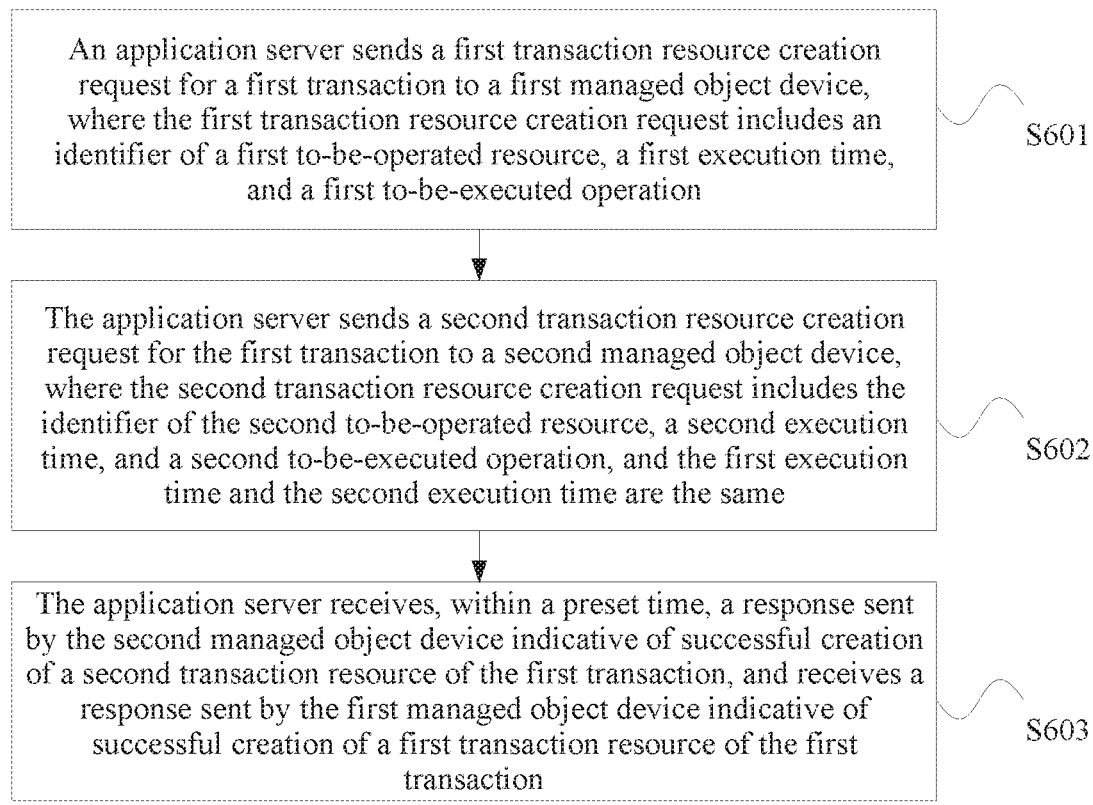
FIG. 7 is a schematic flowchart of Embodiment 3 of a method for executing distributed transaction resources according to the present invention.

FIG. 7 is a schematic flowchart of Embodiment 3 of a method for executing distributed transaction resources according to the present invention. This method is applied to an M2M system. The M2M system includes at least two managed object devices and an application server. A first managed object device is any one of the at least two managed object devices, and the second managed object is any managed object device except the first managed object device in the at least two managed object devices. As shown in FIG. 7, the method includes the following steps.

S601. An application server sends a first transaction resource creation request for a first transaction to a first managed object device, where the first transaction resource creation request includes an identifier of a first to-be-operated resource, a first execution time, and a first to-be-executed operation.

S602. The application server sends a second transaction resource creation request for the first transaction to a second managed object device, where the second transaction resource creation request includes the identifier of the first to-be-operated resource, a second execution time, and a second to-be-executed operation, and the first execution time and the second execution time are the same.

Specifically, the application server sends the first transaction resource creation request for the first transaction to the first managed object device and the second transaction resource creation request for the first transaction to the second managed object device separately, that is, both a first transaction resource and a second transaction resource belong to the first transaction of the application server. The first transaction resource creation request includes the identifier of the first to-be-operated resource, the first execution time, and the first to-be-executed operation. The second transaction resource creation request includes the identifier of the second to-be-operated resource, the second execution time, and the second to-be-executed operation. The first execution time and the second execution time are the same. Optionally, the first to-be-executed operation and the second to-be-executed operation may be the same or may be different. In addition, the first to-be-executed operation or the second to-be-executed operation may be reflected in a primitive form, or may be reflected in another manner.

It should be noted that, operations executed by the first managed device and the second managed object device are similar. Therefore, in all of the following technical solutions, the first managed object device is used as a described object. For the operation executed by the second managed object device, refer to the operation executed by the first managed object device. For the process of creating the second transaction resource by the second managed object device, refer to the process of creating the first transaction resource by the first managed object device.

S603. The application server receives, within a preset time, a response that is sent by the second managed object device and that is indicative of successful creation of a second transaction resource of the first transaction, and receives a response that is sent by the first managed object device and that is indicative of successful creation of a first transaction resource of the first transaction.

Specifically, the first managed object device determines, according to information such as the first execution time and the first to-be-executed operation that are carried in the first transaction resource creation request, whether the first transaction resource can be created successfully. The first to-be-executed operation includes a request for the first to-be-operated resource, and the request may include information such as an initiator of the request, an identifier of a requested target resource, and specific content that is requested.

Optionally, the first managed object device may determine, according to the information included in the first to-be-executed operation, whether the first transaction resource creation request meets a transaction resource creation condition. Specifically, the condition may include content of the following (1) to (4): (1) The first managed object device checks, according to "the identifier of the requested target resource" included in the first to-be-executed operation, whether the target resource requested for the first to-be-executed operation is the first to-be-operated resource. (2) The first managed object device checks, according to "the initiator of the request" included in the first to-be-executed operation, whether the initiator (namely, the application server) has enough rights to initiate the first transaction resource creation request. (3) The first managed object device checks, according to "the requested content" included in the first to-be-executed operation, whether the requested content can be executed for the first to-be-operated resource. (4) The first managed object device checks, according to the first execution time and arrangements of work and sleep periods of the first managed object device, whether execution of the first to-be-executed operation carried in the first transaction resource creation request, at a time specified by the first execution time, can be ensured.

If the foregoing four items are all checked successfully, it indicates that the first transaction resource creation request meets the transaction resource creation condition, and the first managed object device can successfully create the first transaction resource according to the first transaction resource creation request. Based on a feature of a RESTful architecture, the created first transaction resource may include three attributes, namely, a current state of the first transaction resource, the first execution time, and the first to-be-executed operation (correspondingly, the second transaction resource includes three attributes, namely, a state of the second transaction resource, the second execution time, and the second to-be-executed operation).

Further, the first managed object device sends the response indicative of successful creation of the first transaction resource of the first transaction to the application server, so as to notify the application server that the first transaction resource is created successfully. Similar to the foregoing execution process of the first managed object device, the second managed object device also determines that the second transaction resource is created successfully, and sends the response indicative of successful creation of the second transaction resource of the first transaction to the application server, so as to notify the application server that the second transaction resource is created successfully. Regardless of whether the response is the response indicative of successful creation of the first transaction resource or the response indicative of successful creation of the second transaction resource, the response may carry the identifier of the respectively created transaction resource, or may further carry the state of the respectively created transaction resource, where the state may be a reserved state or a semi-reserved state.

It should be noted that, the application server needs to determine whether transaction resource creation responses sent by the first managed object device and the second managed object device are received within the preset time. Herein regardless of whether the transaction resource creation response is a success response or a failure response, as long as the application server fails to receive the transaction resource creation response within the preset time, the application server considers that the transaction resource fails to be created.

If the application server receives, within the preset time, the response that is sent by the second managed object device and that is indicative of successful creation of the second transaction resource, but fails to receive any transaction resource creation response sent by the first managed object device, the application server determines that the first transaction resource fails to be created, and sends a deletion request to the second managed object device that has successfully created the second transaction resource, so as to delete the second transaction resource successfully created on the second managed object device and ensure atomicity of the transaction. If the application server fails to receive, within the preset time, any transaction resource creation response sent by the first managed object device and the second managed object device, the application server terminates the creation procedure.

Further, in this embodiment of the present invention, because both the first managed object device and the second managed object device send responses about successful creation of transaction resources of the first transaction to the application server, the application server determines, after determining that the response indicative of successful creation of the first transaction resource and the response indicative of successful creation of the second transaction resource are received within the preset time, not to send a processing request to the first managed object device and the second managed object device. Therefore, the first managed object device fails to receive, before the first execution time arrives (or the second managed object device fails to receive, before the second execution time arrives), the processing request sent by the application server. Therefore, when the first execution time (second execution time) arrives, the first managed object device and the second managed object can simultaneously execute the to-be-executed operations in the transaction resources respectively created by the devices.

In the method for executing distributed transaction resources according to this embodiment of the present invention, transaction resource creation requests sent by an application server to multiple managed object devices carry a same execution time, so that when it is determined that transaction resources are created successfully and the execution time arrives, the multiple managed object devices simultaneously execute the transaction resources created by the managed object devices, thereby ensuring that the transaction resources are executed simultaneously. In addition, in this embodiment of the present invention, to ensure that the transaction resources are executed simultaneously, the application server needs to send only one transaction resource creation request to a managed object device. Therefore, signaling overheads of the application server are reduced.

Figure 8:
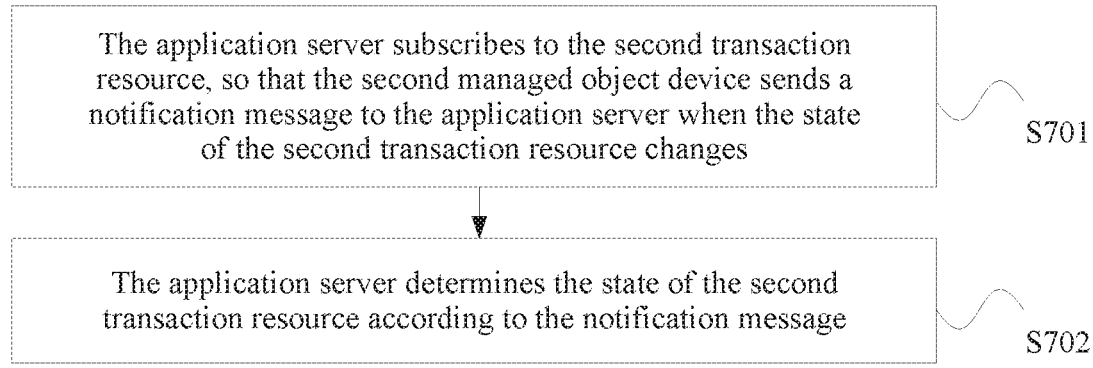
FIG. 8 is a schematic flowchart of Embodiment 4 of a method for executing distributed transaction resources according to the present invention.

Further, if the state of the second transaction resource carried in the response, sent by the second managed object device to the application server after the second managed object device successfully creates the second transaction resource, about successful creation of the second transaction resource, is the semi-reserved state, after the foregoing S603, referring to FIG. 8, the method further includes:

S701. The application server subscribes to the second transaction resource, so that the second managed object device sends a notification message to the application server when the state of the second transaction resource changes.

S702. The application server determines the state of the second transaction resource according to the notification message.

In this embodiment, the application server can monitor the state of the second transaction resource on the second managed object device at anytime, and trace a change at any time when the state of the second transaction resource changes. This ensures accuracy of the state when the transaction resource is executed.

FIG. 9 is a schematic flowchart of Embodiment 5 of a method for executing distributed transaction resources according to the present invention. Based on the foregoing embodiment shown in FIG. 7 or FIG. 8, the method used in this embodiment is a process in which the first managed object device determines that a third transaction resource fails to be created, and sends a response indicative of unsuccessful creation of the third transaction resource to the application server. As shown in FIG. 9, the method includes the following steps.

S801. The application server sends a third transaction resource creation request for a second transaction to the first managed object device, where the third transaction resource creation request includes the identifier of the first to-be-operated resource, a third execution time, and a third to-be-executed operation.

S802. The application server sends a fourth transaction resource creation request for the second transaction to the second managed object device, where the fourth transaction resource creation request includes the identifier of the first to-be-operated resource, a fourth execution time, and a fourth to-be-executed operation, and the third execution time and the fourth execution time are the same.

Specifically, the application server sends the third transaction resource creation request for the second transaction to the first managed object device and the fourth transaction resource creation request for the second transaction to the second managed object device respectively, that is, both a third transaction resource and a fourth transaction resource belong to the second transaction of the application server. The third transaction resource creation request includes the identifier of the first to-be-operated resource, the third execution time, and the third to-be-executed operation. The fourth transaction resource creation request includes the identifier of the second to-be-operated resource, the fourth execution time, and the fourth to-be-executed operation. The third execution time and the fourth execution time are the same. Optionally, the third to-be-executed operation and the fourth to-be-executed operation may be the same or may be different. In addition, the third to-be-executed operation or the fourth to-be-executed operation may be reflected in a primitive form, or may be reflected in another manner.

S803. The application server receives, within a preset time, a response that is sent by the first managed object device and that is indicative of unsuccessful creation of a third transaction resource of the second transaction, and receives, within the preset time, a response that is sent by the second managed object device and that is indicative of successful creation of a fourth transaction resource of the second transaction, where the response indicative of successful creation of the fourth transaction resource carries an identifier of the fourth transaction resource.

Specifically, the first managed object device determines, according to information such as the third execution time and the third to-be-executed operation carried in the third transaction resource creation request, whether the third transaction resource can be created successfully. For a specific determining process, refer to the determining process in (1) to (4) in the foregoing embodiment shown in FIG. 7, and details are not described again herein.

If the first managed object device fails to check any one of the foregoing four items, it indicates that the third transaction resource creation request does not meet the transaction resource creation condition. The first managed object device determines that the third transaction resource fails to be created, and sends the response indicative of unsuccessful creation of the third transaction resource of the second transaction to the application server. If the second managed object device checks all the foregoing four items successfully, it indicates that the fourth transaction resource creation request meets the transaction resource creation condition. The second managed object device can successfully create the fourth transaction resource according to the fourth transaction resource creation request, and send the response indicative of successful creation of the fourth transaction resource of the second transaction to the application server, so as to notify the application server that the fourth transaction resource is created successfully. The response indicative of successful creation of the fourth transaction resource may carry the identifier of the fourth transaction resource, and may further carry a state of the created fourth transaction resource, where the state is the reserved state or the semi-reserved state.

Optionally, when the first managed object device determines that no first transaction resource queue corresponding to the first to-be-operated resource exists on the first managed object device, if the first managed object device determines, according to information included in the third to-be-executed operation, that the third transaction resource creation request does not meet the content of (1) in the foregoing transaction resource creation condition, the first managed object device determines, according to the third transaction resource creation request, that the third transaction resource fails to be created, and sends a first failure response to the application server, so as to notify the application server that the third transaction resource cannot be created successfully.

Optionally, when the first managed object device determines that no first transaction resource queue corresponding to the first to-be-operated resource exists on the first managed object device, if the first managed object device determines, according to information included in the third to-be-executed operation, that the third transaction resource creation request does not meet the content of any one of (2) to (4) in the foregoing transaction resource creation condition, the first managed object device determines, according to the third transaction resource creation request, that the third transaction resource fails to be created, and sends a second failure response that carries the updated third execution time to the application server, so as to notify the application server that the current third execution time is not appropriate, but the first managed object device can create the third transaction resource successfully by using the updated third execution time carried in the second failure response.

Optionally, if the first managed object device determines, according to the third execution time, that a first transaction resource queue corresponding to the first to-be-operated resource exists on the first managed object device, the first managed object device determines, according to the third execution time in the third transaction resource creation request and a state of the first to-be-operated resource, that the third transaction resource fails to be created. Specifically the following two cases are included.

First case: The first managed object device determines, according to the third execution time and the state of the first to-be-operated resource, that the preset resource creation condition is not met when the third execution time is updated to any time later than an execution time of each transaction resource in the first transaction resource queue. In this case, the first managed object device sends the first failure response to the application server.

Second case: The first managed object device determines, according to the third execution time and the state of the first to-be-operated resource, that the preset resource creation condition is met when the third execution time is updated to a time later than an execution time of any transaction resource in the first transaction resource queue. The first managed object device sends the second failure response that carries the updated third execution time to the application server. For a specific determining process of the first managed object device, refer to the technical solution in the first possible implementation manner or the second possible implementation manner of the embodiment shown in FIG. 3. Details are not described again herein.

Therefore, the application server determines that the response that is sent by the first managed object device and that is indicative of unsuccessful creation of the third transaction resource of the second transaction and the response that is sent by the second managed object device and that is indicative of successful creation of the fourth transaction resource of the second transaction are received within the preset time.

S804. The application server sends, based on the response indicative of unsuccessful creation of the third transaction resource of the second transaction and the response indicative of successful creation of the fourth transaction resource of the second transaction, a processing request for the fourth transaction resource of the second transaction to the second managed object device that sends the response indicative of successful creation of the fourth transaction resource, where the processing request for the fourth transaction resource of the second transaction carries the identifier of the fourth transaction resource.

Specifically, after the application server receives, within the preset time, the response that is sent by the first managed object device and that is indicative of unsuccessful creation of the third transaction resource (the response indicative of creation failure of the third transaction resource is the first failure response or the second failure response) and the response that is sent by the second managed object device and that is indicative of creation success of the fourth transaction resource, the application server learns that the first managed object device fails to create the third transaction resource and learns that the second managed object device creates the fourth transaction resource successfully. Therefore, the application server sends, according to the response indicative of unsuccessful creation of the third transaction resource, the processing request for the fourth transaction resource of the second transaction to the second managed object device that sends the response indicative of successful creation of the fourth transaction resource. Specifically, the following two manners are available:

First manner: If the application server determines that the response indicative of unsuccessful creation of the third transaction resource is the first failure response that does not carry the updated third execution time, the application server sends a deletion request carrying the identifier of the fourth transaction resource to the second managed object device that sends the response indicative of successful creation of the fourth transaction resource.

Specifically, for the operation executed after the second managed object device receives the deletion request, refer to the process of deleting the fourth transaction resource by the second managed object device according to the identifier of the fourth transaction resource in the fifth possible implementation manner of the embodiment shown in FIG. 3. Details are not described again herein.

Second manner: If the application server determines that the response indicative of unsuccessful creation of the third transaction resource is the second failure response carrying the updated third execution time, the application server sends an update request carrying the updated third execution time and the identifier of the fourth transaction resource to the second managed object device that sends the response indicative of successful creation of the fourth transaction resource, where the updated third execution time is a time of successfully creating the third transaction resource by the first managed object device.

Specifically, for the operation executed after the second managed object device receives the update request, refer to the process of updating the fourth transaction resource by the second managed object device according to the identifier of the fourth transaction resource and the updated third execution time in the fourth possible implementation manner of the embodiment shown in FIG. 3. Details are not described again herein.

It should be noted that, when sending the update request to the second managed object device, the application server further sends a new third transaction resource creation request carrying the updated third execution time to the first managed object device, so that the first managed object device successfully creates a new third transaction resource according to the updated third execution time. Assuming that the second managed object device that sends the response indicative of successful creation of the fourth transaction resource can also successfully update the previously created fourth transaction resource according to the updated third execution time, the application server does not send the processing request for the fourth transaction resource of the second transaction to the second managed object device, that is, before the updated third execution time arrives, the second managed object device that sends the response indicative of successful creation of the fourth transaction resource fails to receive the processing request sent by the application server for the fourth transaction resource of the second transaction. Therefore, when the updated third execution time arrives, the first managed object device and the second managed object device can simultaneously execute the to-be-executed operations in the transaction resources created by the devices.

In the method for executing distributed transaction resources according to this embodiment of the present invention, an application server sends a third transaction resource creation request to a first managed object device, and a third execution time carried in the third transaction resource creation request is the same as a fourth execution time carried in a fourth transaction resource creation request sent by the application server to a second managed object device, and after the application server determines that a response that is sent by the first managed object device and that is indicative of unsuccessful creation of a third transaction resource and a response that is sent by the second managed object device and that is indicative of successful creation of a fourth transaction resource are received within a preset time, the application server sends a processing request for the fourth transaction resource of a second transaction to the second managed object device. In the method provided by this embodiment of the present invention, the second managed object device can ensure, according to the processing request sent by the application server (when the processing request is an update request), that a time of executing the updated fourth transaction resource by the second managed object device is the same as a time at which the first managed object device executes a new third transaction resource created by the first managed object device, that is, it is ensured that the first managed object device and the second managed object device can simultaneously execute operations to be executed by the devices. Therefore, simultaneous execution of transaction resources is ensured.

A person of ordinary skill in the art may understand that all or some steps of the method embodiments may be implemented by a program instructing relevant hardware. The program may be stored in a computer-readable storage medium. When the program runs, the steps of the method embodiments are performed. The storage medium includes any medium that can store program code, such as a ROM, a RAM, a magnetic disk, or an optical disc.

Figure 10:
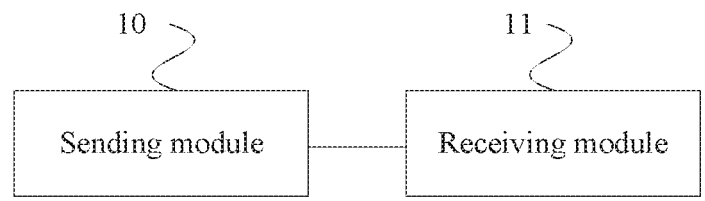
FIG. 10 is a schematic structural diagram of an embodiment of an application server according to the present invention.

FIG. 10 is a schematic structural diagram of an embodiment of an application server according to the present invention. As shown in FIG. 10, the application server is applied to an M2M system. The M2M system includes at least two managed object devices and the application server. A first managed object device is any one of the at least two managed object devices, and the second managed object is any managed object device in the at least two managed object devices except the first managed object device. The application server includes a sending module 10 and a receiving module 11.

Specifically, the sending module 10 is configured to send a first transaction resource creation request for a first transaction to the first managed object device, where the first transaction resource creation request includes an identifier of a first to-be-operated resource, a first execution time, and a first to-be-executed operation; and further configured to send a second transaction resource creation request for the first transaction to the second managed object device, where the second transaction resource creation request includes the identifier of the first to-be-operated resource, a second execution time, and a second to-be-executed operation, and the first execution time and the second execution time are the same.

The receiving module 11 is configured to receive, within a preset time, a response that is sent by the second managed object device and that is indicative of successful creation of a second transaction resource of the first transaction, and receive a response that is sent by the first managed object device and that is indicative of successful creation of a first transaction resource of the first transaction.

For the application server provided by this embodiment of the present invention, refer to the execution process of the foregoing method embodiment of the application server. An implementation principle and a technical effect thereof are similar to those of the method embodiment, and details are not described again herein.

Further, the sending module 10 is further configured to send a third transaction resource creation request for a second transaction to the first managed object device, where the third transaction resource creation request includes the identifier of the first to-be-operated resource, a third execution time, and a third to-be-executed operation; and further configured to send a fourth transaction resource creation request for the second transaction to the second managed object device, where the fourth transaction resource creation request includes the identifier of the second to-be-operated resource, a fourth execution time, and a fourth to-be-executed operation, and the third execution time and the fourth execution time are the same.

The receiving module 11 is further configured to receive, within a preset time, a response that is sent by the first managed object device and that is indicative of unsuccessful creation of a third transaction resource of the second transaction, and receive, within the preset time, a response that is sent by the second managed object device and that is indicative of successful creation of a fourth transaction resource of the second transaction, where the response indicative of successful creation of the fourth transaction resource carries an identifier of the fourth transaction resource. In this case, the sending module 10 is further configured to send, based on the response indicative of unsuccessful creation of the third transaction resource of the second transaction and the response indicative of successful creation of the fourth transaction resource of the second transaction, a processing request for the fourth transaction resource of the second transaction to the second managed object device that sends the response indicative of successful creation of the fourth transaction resource, where the processing request for the fourth transaction resource of the second transaction carries the identifier of the fourth transaction resource.

Further, the sending module 10 is specifically configured to determine that the response indicative of unsuccessful creation of the third transaction resource of the second transaction is a first failure response that does not carry an updated third execution time, and send a deletion request carrying the identifier of the fourth transaction resource to the second managed object device that sends the response indicative of successful creation of the fourth transaction resource; or determine that the response indicative of unsuccessful creation of the third transaction resource of the second transaction is a second failure response carrying the updated third execution time, and send an update request carrying the updated third execution time and the identifier of the fourth transaction resource to the second managed object device that sends the response indicative of successful creation of the fourth transaction resource; and further configured to send a third transaction resource creation request carrying the updated third execution time to the first managed device.

For the application server provided by this embodiment of the present invention, refer to the execution process of the foregoing method embodiment of the application server. An implementation principle and a technical effect thereof are similar to those of the method embodiment, and details are not described again herein.

Figure 11:
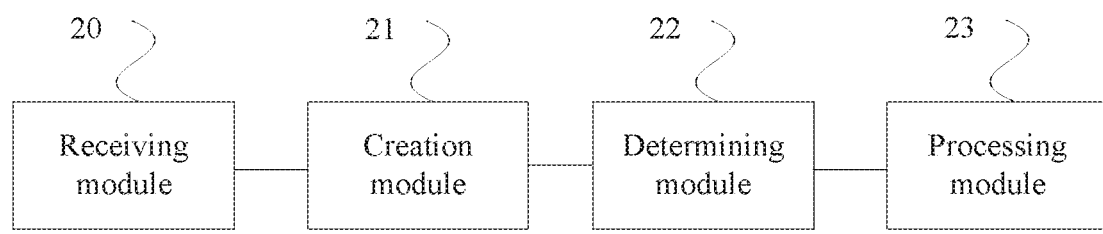
FIG. 11 is a schematic structural diagram of Embodiment 1 of a managed object device according to the present invention.

FIG. 11 is a schematic structural diagram of Embodiment 1 of a managed object device according to the present invention. The managed object device is applied to a machine to machine communications M2M system. The M2M system includes at least two managed object devices and an application server. The managed object device is any one of the at least two managed object devices, and a second managed object device is any managed object device in the at least two managed object devices except the managed object device. As shown in FIG. 11, the managed object device includes a receiving module 20, a creation module 21, a determining module 22, and a processing module 23.

The receiving module 20 is configured to receive a first transaction resource creation request sent by the application server for a first transaction, where the first transaction resource creation request includes an identifier of a first to-be-operated resource, a first execution time, and a first to-be-executed operation, the first execution time is the same as a second execution time in a second transaction resource creation request for the first transaction, and the second transaction resource creation request is received by the second managed object device other than the managed object device in the M2M system. The creation module 21 is configured to successfully create a first transaction resource according to the first transaction resource creation request, where the first transaction resource includes the first execution time and the first to-be-executed operation. The determining module 22 is configured to determine, when the first execution time arrives, that a processing request sent by the application server for the first transaction resource of the first transaction is not received, where the processing request for the first transaction resource of the first transaction is sent after the application server receives a response that is sent by the second managed object device and that is indicative of unsuccessful creation of a second transaction resource of the first transaction. The processing module 23 is configured to execute the first to-be-executed operation.

For the managed object device provided by this embodiment of the present invention, refer to the execution process of the foregoing method embodiment. An implementation principle and a technical effect thereof are similar to those of the method embodiment, and details are not described again herein.

Figure 12:
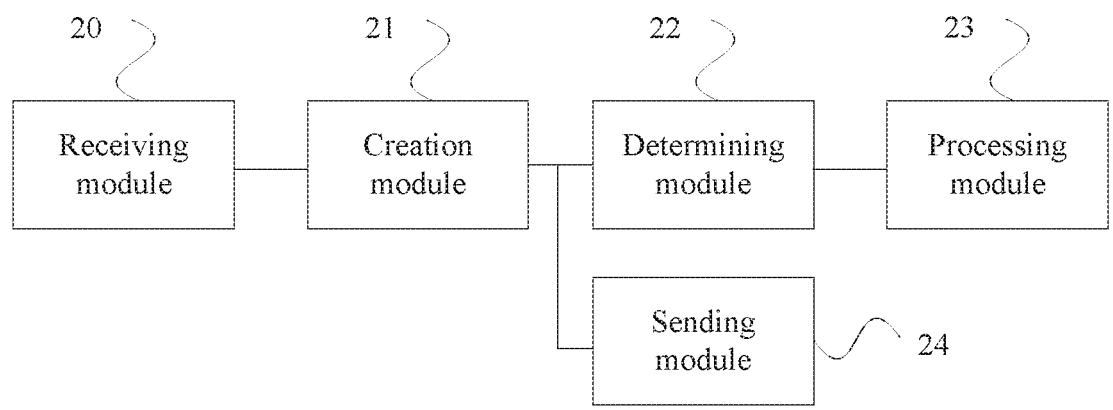
FIG. 12 is a schematic structural diagram of Embodiment 2 of a managed object device according to the present invention.

FIG. 12 is a schematic structural diagram of Embodiment 2 of a managed object device according to the present invention. This embodiment relates to a specific process of creating a third transaction resource by the managed object device. Based on the foregoing embodiment shown in FIG. 11, the managed object device further includes a sending module 24.

The receiving module 20 is further configured to receive a third transaction resource creation request sent by the application server for a second transaction, where the third transaction resource creation request includes the identifier of the first to-be-operated resource, a third execution time, and a third to-be-executed operation, and the third execution time is the same as a fourth execution time in a fourth transaction resource creation request received by the second managed object device for the second transaction. The creation module 21 is further configured to determine that a third transaction resource fails to be created according to the third transaction resource creation request. The sending module 24 is configured to send a response indicative of unsuccessful creation of the third transaction resource of the second transaction to the application server.

Further, the creation module 21 is specifically configured to determine that a first transaction resource queue exists on the managed object device, determine, according to the third execution time and a state of the first to-be-operated resource of the managed object device, that the third transaction resource does not meet a preset resource creation condition, and determine, according to the preset resource creation condition, to update the third execution time to a time later than an execution time of a transaction resource in the first transaction resource queue, where the first transaction resource queue includes at least one transaction resource. The sending module 24 is specifically configured to send a second failure response carrying the updated third execution time to the application server.

For the managed object device provided by this embodiment of the present invention, refer to the execution process of the foregoing method embodiment. An implementation principle and a technical effect thereof are similar to those of the method embodiment, and details are not described again herein.

Still referring to FIG. 12, this embodiment relates to a specific process in which the managed object device successfully creates a third transaction resource, the second managed object device successfully creates a fourth transaction resource, and the managed object device processes the created third transaction resource according to a processing request sent by the application server for the third transaction resource of a second transaction. Specifically:

The receiving module 20 is further configured to receive a third transaction resource creation request sent by the application server for a second transaction, where the third transaction resource creation request includes the identifier of the first to-be-operated resource, a third execution time, and a third to-be-executed operation, and the third execution time is the same as a fourth execution time in a fourth transaction resource creation request received by the second managed object device for the second transaction. The creation module 21 is further configured to successfully create the third transaction resource according to the third transaction resource creation request. The sending module 24 is further configured to send a response indicative of successful creation of the third transaction resource of the second transaction to the application server, where the response indicative of successful creation of the third transaction resource carries an identifier of the third transaction resource. The determining module 22 is further configured to determine, before the third execution time arrives, that a processing request sent by the application server for the third transaction resource of the second transaction is received, where the processing request for the third transaction resource of the second transaction carries the identifier of the third transaction resource. The processing module 23 is further configured to process the created third transaction resource according to the identifier of the third transaction resource.

Further, the creation module 21 is specifically configured to determine that a first transaction resource queue exists on the managed object device, determine, according to the third execution time and a state of the first to-be-operated resource of the managed object device, that the third transaction resource meets a preset resource creation condition, and create the third transaction resource, where the first transaction resource queue includes at least one transaction resource.

Optionally, the processing request for the third transaction resource of the second transaction is an update request that carries the identifier of the third transaction resource and an updated fourth execution time, and the processing module 23 is specifically configured to successfully update the third transaction resource according to the updated fourth execution time, and after the update succeeds, return an update success response message to the application server; or fail to update the third transaction resource according to the updated fourth execution time, and return an update failure response message to the application server. Further, the processing module 23 is specifically configured to delete the third transaction resource on the managed object device according to the identifier of the third transaction resource, use the updated fourth execution time as an execution time of a new third transaction resource, determine, according to the execution time of the new third transaction resource and the state of the first to-be-operated resource of the managed object device, that the new third transaction resource meets the preset resource creation condition, and create the new third transaction resource according to the updated fourth execution time.

It should be noted that, for the process of updating the third transaction resource by the managed object device, refer to the process of updating the fourth transaction resource by the second managed object device in the method embodiment, and details are not described again herein.

Optionally, the processing request for the third transaction resource of the second transaction is a deletion request that carries the identifier of the third transaction resource, and the processing module 23 is specifically configured to delete the third transaction resource on the managed object device according to the identifier of the third transaction resource.

Optionally, one transaction resource in the first transaction resource queue is in a reserved state, and the processing module 23 is further configured to: determine, according to the state of the first to-be-operated resource after a transaction resource at a first position in the first transaction resource queue is executed, whether a transaction resource at the second position can be executed successfully; and if the transaction resource at the second position is executed successfully, send a first deletion response to the application server, and after the transaction resource at the first position is executed, update a state of the transaction resource at the second position to the reserved state; or if the transaction resource at the second position fails to be executed, delete the transaction resource at the second position; where the first position is a position previous to the third transaction resource in the first transaction resource queue, and the second position is a position next to the third transaction resource in the first transaction resource queue.

Optionally, at least two transaction resources in the first transaction resource queue are in a reserved state, and the processing module 23 is further configured to: determine whether a transaction resource in a semi-reserved state in the first transaction resource queue meets a preset deletion condition; and if yes, delete the transaction resource in the semi-reserved state, and send a second deletion response to the application server; or if not, determine, according to the state of the first to-be-operated resource after any transaction resource previous to the transaction resource in the semi-reserved state is executed, that the transaction resource in the semi-reserved state can be executed successfully, and update the transaction resource in the semi-reserved state to the reserved state.

It should be noted that, for the process of deleting the third transaction resource by the managed object device, refer to the process of deleting the fourth transaction resource by the second managed object device in the method embodiment, and details are not described again herein.

For the managed object device provided by this embodiment of the present invention, refer to the execution process of the foregoing method embodiment. An implementation principle and a technical effect thereof are similar to those of the method embodiment, and details are not described again herein.

Figure 13:
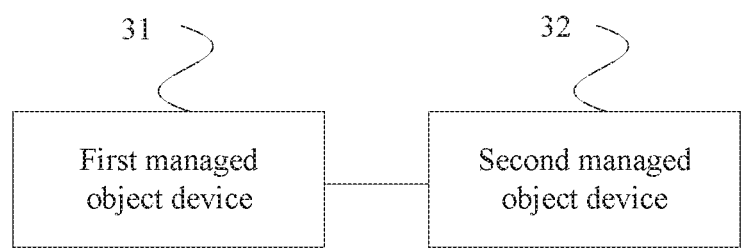
FIG. 13 is a schematic structural diagram of an embodiment of a system for executing distributed transaction resources according to the present invention.

FIG. 13 is a schematic structural diagram of an embodiment of a system for executing distributed transaction resources according to the present invention. The system is applied to an M2M system. The M2M system includes at least two managed object devices and an application server. A first managed object device 31 is any one of the at least two managed object devices, and a second managed object device 32 is any managed object device in the at least two managed object devices except the first managed object device. As shown in FIG. 13, the system for executing distributed transaction resources includes the first managed object device 31 and the second managed object device 32. Specifically:

The first managed object device 31 is configured to receive a first transaction resource creation request sent by the application server for a first transaction, successfully create a first transaction resource of the first transaction according to the first transaction resource creation request, and send a response indicative of successful creation of the first transaction resource of the first transaction to the application server, where the first transaction resource creation request includes an identifier of a first to-be-operated resource, a first execution time, and a first to-be-executed operation. The second managed object device 32 is configured to receive a second transaction resource creation request sent by the application server for the first transaction, successfully create a second transaction resource of the first transaction according to the second transaction resource creation request, and send a response indicative of successful creation of the second transaction resource of the first transaction to the application server, where the second transaction resource creation request includes an identifier of a second to-be-operated resource, a second execution time, and a second to-be-executed operation, the first execution time and the second execution time are the same, the first transaction resource includes the first execution time and the first to-be-executed operation, and the second transaction resource includes the second execution time and the second to-be-executed operation. When the first execution time arrives, the first managed object device 31 and the second managed device 32 are configured to respectively execute the operations to be executed by the devices.

For the system for executing distributed transaction resources according to this embodiment of the present invention, refer to the execution process of the foregoing method embodiment. An implementation principle and a technical effect thereof are similar to those of the method embodiment, and details are not described again herein.

Further, the first managed object device 31 is further configured to receive a third transaction resource creation request sent by the application server for a second transaction, determine that a third transaction resource of the second transaction fails to be created according to the third transaction resource creation request, and send a response indicative of unsuccessful creation of the third transaction resource of the second transaction to the application server, where the third transaction resource creation request includes the identifier of the first to-be-operated resource, a third execution time, and a third to-be-executed operation. The second managed object device 32 is further configured to receive a fourth transaction resource creation request sent by the application server for the second transaction, successfully create a fourth transaction resource of the second transaction according to the fourth transaction resource creation request, and send a response indicative of successful creation of the fourth transaction resource of the second transaction to the application server, where the fourth transaction resource creation request includes the identifier of the second to-be-operated resource, a fourth execution time, and a fourth to-be-executed operation, the third execution time and the fourth execution time are the same, and the response indicative of successful creation of the fourth transaction resource carries an identifier of the fourth transaction resource. The second managed object device 32 that sends the response indicative of successful creation of the fourth transaction resource to the application server is further configured to receive a processing request sent by the application server for the fourth transaction resource of the second transaction, and process the created fourth transaction resource according to the identifier of the fourth transaction resource, where the processing request for the fourth transaction resource of the second transaction carries the identifier of the fourth transaction resource.

Still further, the first managed object device 31 is specifically configured to determine that a first transaction resource queue exists on the first managed object device 31, determine, according to the third execution time and a state of the first to-be-operated resource of the first managed object device 31, that the third transaction resource does not meet a preset resource creation condition, determine, according to the preset resource creation condition, to update the third execution time to a time later than an execution time of a transaction resource in the first transaction resource queue, and send a second failure response carrying the updated third execution time to the application server, where the first transaction resource queue includes at least one transaction resource.

Still further, the second managed object device 32 is specifically configured to determine that a second transaction resource queue exists on the second managed object device 32, determine, according to the fourth execution time and a state of the second to-be-operated resource of the second managed object device 32, that the fourth transaction resource meets the preset resource creation condition, and create the fourth transaction resource, where the second transaction resource queue includes at least one transaction resource.

For the system for executing distributed transaction resources according to this embodiment of the present invention, refer to the execution process of the foregoing method embodiment. An implementation principle and a technical effect thereof are similar to those of the method embodiment, and details are not described again herein.

Optionally, the processing request for the fourth transaction resource of the second transaction is an update request that carries the identifier of the fourth transaction resource and the updated third execution time; and the second managed object device 32 is further configured to successfully update the fourth transaction resource according to the updated third execution time, and after the update succeeds, return an update success response message to the application server; or fail to update the fourth transaction resource according to the updated third execution time, and return an update failure response message to the application server.

Further, the second managed object device 32 is further configured to delete the fourth transaction resource on the second managed object device 32 according to the identifier of the fourth transaction resource, use the updated third execution time as an execution time of a new fourth transaction resource, determine, according to the execution time of the new fourth transaction resource and the state of the second to-be-operated resource of the second managed object device 32, that the new fourth transaction resource meets the preset resource creation condition, and create the new fourth transaction resource according to the updated third execution time.

For the system for executing distributed transaction resources according to this embodiment of the present invention, refer to the execution process of the foregoing method embodiment. An implementation principle and a technical effect thereof are similar to those of the method embodiment, and details are not described again herein.

Optionally, the processing request for the fourth transaction resource of the second transaction is a deletion request that carries the identifier of the fourth transaction resource, and the second managed object device 32 is further configured to delete the fourth transaction resource on the second managed object device according to the identifier of the fourth transaction resource.

Optionally, one transaction resource in the second transaction resource queue is in a reserved state, and the second managed object device 32 is further configured to determine, according to the state of the second to-be-operated resource after a transaction resource at a first position in the second transaction resource queue is executed, whether a transaction resource at the second position can be executed successfully, where the first position is a position previous to the fourth transaction resource in the second transaction resource queue, and the second position is a position next to the fourth transaction resource in the second transaction resource queue; and if the transaction resource at the second position is executed successfully, the second managed object device 32 is further configured to send a first deletion response to the application server, and after the transaction resource at the first position is executed, update a state of the transaction resource at the second position to the reserved state; or if the transaction resource at the second position fails to be executed, the second managed object device 32 is further configured to delete the transaction resource at the second position.

Optionally, at least two transaction resources in the second transaction resource queue are in a reserved state, and the second managed object device 32 is further configured to determine whether a transaction resource in a semi-reserved state in the second transaction resource queue meets a preset deletion condition; and if the transaction resource in the semi-reserved state in the second transaction resource queue meets the preset deletion condition, the second managed object device 32 is further configured to delete the transaction resource in the semi-reserved state, and send a second deletion response to the application server; or if the transaction resource in the semi-reserved state in the second transaction resource queue does not meet the preset deletion condition, the second managed object device 32 is further configured to determine, according to the state of the second to-be-operated resource after any transaction resource previous to the transaction resource in the semi-reserved state is executed, that the transaction resource in the semi-reserved state can be executed successfully, and update the transaction resource in the semi-reserved state to the reserved state.

For the system for executing distributed transaction resources according to this embodiment of the present invention, refer to the execution process of the foregoing method embodiment. An implementation principle and a technical effect thereof are similar to those of the method embodiment, and details are not described again herein.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for executing distributed transaction resources for a machine to machine communications (M2M) system, the method comprising:
  receiving, by a first managed object device, a first transaction resource creation request sent by an application server for a first transaction, wherein the first transaction resource creation request comprises an identifier of a first to-be-operated resource, a first execution time, and a first to-be-executed operation;
  receiving, by a second managed object device, a second transaction resource creation request sent by the application server for the first transaction, wherein the second transaction resource creation request comprises the identifier of a second to-be-operated resource, a second execution time, and a second to-be-executed operation;

sending, by the first managed object device, a response indicative of unsuccessful creation of the first transaction resource of the first transaction to the application server; and sending, by the second managed object device, a response indicative of successful creation of a second transaction resource of the first transaction to the application server, wherein the response indicative of successful creation of the second transaction resource carries an identifier of the second transaction resource;

receiving, by the second managed object device, a processing request sent by the application server for the second transaction resource of the first transaction, wherein the processing request for the second transaction resource of the first transaction carries the identifier of the second transaction resource; and processing, by the second managed object device, the created second transaction resource according to the identifier of the second transaction resource.

2. The method according to claim 1, wherein the method further comprises:

determining, by the first managed object device, that a first transaction resource queue exists on the first managed object device, wherein the first transaction resource queue comprises at least one transaction resource;

determining, by the first managed object device according to the first execution time and a state of the first to-be-operated resource of the first managed object device, that the first transaction resource does not meet a preset resource creation condition;

determining, by the first managed object device according to the preset resource creation condition, to update the first execution time to a time later than an execution time of a transaction resource in the first transaction resource queue; and sending, by the first managed object device, a second failure response carrying the updated first execution time to the application server.

3. The method according to claim 1, wherein before sending, by the second managed object device, a response indicative of successful creation of a second transaction resource of the first transaction to the application server, the method further comprises:

determining, by the second managed object device, that a second transaction resource queue exists on the second managed object device, wherein the second transaction resource queue comprises at least one transaction resource; and determining, by the second managed object device according to the second execution time and a state of the second to-be-operated resource of the second managed object device, that the second transaction resource meets a preset resource creation condition, and creating the second transaction resource.

4. The method according to claim 3, wherein one transaction resource in the second transaction resource queue is in a reserved state, and after deleting the second transaction resource on the second managed object device, the method further comprises:

determining, by the second managed object device, according to the state of the second to-be-operated resource after a transaction resource at a first position in the second transaction resource queue is executed, whether a transaction resource at a second position can be executed successfully, wherein the first position is a position previous to the second transaction resource in the second transaction resource queue, and the second position is a position next to the second transaction resource in the second transaction resource queue; and in response to determining that the transaction resource at the second position is executed successfully, sending, by the second managed object device, a first deletion response to the application server, and after the transaction resource at the first position is executed, updating a state of the transaction resource at the second position to the reserved state; and in response to determining that the transaction resource at the second position fails to be executed, deleting, by the second managed object device, the transaction resource at the second position.

5. The method according to claim 1, wherein the processing request for the second transaction resource of the first transaction is an update request that carries the identifier of the second transaction resource and an updated first execution time; and wherein the processing the created second transaction resource , by the second managed object device comprises:

successfully updating, by the second managed object device, the second transaction resource according to the updated first execution time, and returning an update success response message to the application server; or failing to update the second transaction resource according to the updated first execution time, and returning an update failure response message to the application server.

6. The method according to claim 5, wherein successfully updating the second transaction resource comprises:

deleting, by the second managed object device, the second transaction resource on the second managed object device according to the identifier of the second transaction resource;

using, by the second managed object device, the updated first execution time as an execution time of a new second transaction resource;

determining, by the second managed object device according to the execution time of the new second transaction resource and the state of the second to-be-operated resource of the second managed object device, that the new second transaction resource meets a preset resource creation condition; and creating, by the second managed object device, the new second transaction resource according to the updated first execution time.

7. The method according to claim 1, wherein the processing request for the second transaction resource of the first transaction is a deletion request that carries the identifier of the second transaction resource; and wherein the processing the created second transaction resource comprises:

deleting, by the second managed object device, the second transaction resource on the second managed object device according to the identifier of the second transaction resource.

8. The method according to claim 7, wherein at least two transaction resources in the second transaction resource queue are in a reserved state, and after the deleting the second transaction resource on the second managed object device, the method further comprises:

determining, by the second managed object device, whether a transaction resource in a semi-reserved state in the second transaction resource queue meets a preset deletion condition; and in response to determining that the transaction resource in the semi-reserved state in the second transaction resource queue meets the preset deletion condition, deleting, by the second managed object device, the transaction resource in the semi-reserved state, and sending a second deletion response to the application server; and in response to determining that the transaction resource in the semi-reserved state in the second transaction resource queue does not meet the preset deletion condition, determining, by the second managed object device, according to the state of the second to-be-operated resource after any transaction resource previous to the transaction resource in the semi-reserved state is executed, that the transaction resource in the semi-reserved state can be executed successfully, and updating, by the second managed object device, the transaction resource in the semi-reserved state to the reserved state.

9. A method for executing distributed transaction resources for a machine to machine communications (M2M) system, the method comprising:

sending, by an application server, a first transaction resource creation request for a first transaction to a first managed object device, wherein the first transaction resource creation request comprises an identifier of a first to-be-operated resource, a first execution time, and a first to-be-executed operation;

sending, by the application server, a second transaction resource creation request for the first transaction to a second managed object device, wherein the second transaction resource creation request comprises an identifier of the second to-be-operated resource, a second execution time, and a second to-be-executed operation;

receiving, by the application server, within a preset time, a response that is sent by the first managed object device and that is indicative of unsuccessful creation of a first transaction resource of the first transaction, and receiving, within the preset time, a response that is sent by the second managed object device and that is indicative of successful creation of a second transaction resource of the first transaction, wherein the response indicative of successful creation of the second transaction resource carries an identifier of the second transaction resource; and sending, by the application server, according to the response indicative of unsuccessful creation of the first transaction resource of the first transaction and the response indicative of successful creation of the second transaction resource of the first transaction, a processing request for the second transaction resource of the first transaction to the second managed object device that sends the response indicative of successful creation of the second transaction resource, wherein the processing request for the second transaction resource of the first transaction carries the identifier of the second transaction resource.

10. The method according to claim 9, wherein sending the processing request for the second transaction resource comprises:

determining, by the application server, that the response indicative of unsuccessful creation of the first transaction resource of the first transaction is a first failure response that does not carry an updated first execution time, and sending a deletion request carrying the identifier of the second transaction resource to the second managed object device that sends the response indicative of successful creation of the second transaction resource; or determining, by the application server, that the response indicative of unsuccessful creation of the first transaction resource of the first transaction is a second failure response carrying an updated first execution time, and sending an update request carrying the updated first execution time and the identifier of the second transaction resource to the second managed object device that sends the response indicative of successful creation of the second transaction resource; and wherein the method further comprises: sending, by the application server, a first transaction resource creation request carrying the updated first execution time to the first managed object device.

11. An application server for a machine to machine communications (M2M) system comprising:

a processor;

a memory storing a program to be executed in the processor, the program comprising instructions for:

sending a first transaction resource creation request for a first transaction to a first managed object device, wherein the first transaction resource creation request comprises an identifier of a first to-be-operated resource, a first execution time, and a first to-be-executed operation; and sending a second transaction resource creation request for the first transaction to the second managed object device, wherein the second transaction resource creation request comprises the identifier of the second to-be-operated resource, a second execution time, and a second to-be-executed operation;

receiving, within a preset time, a response that is sent by the first managed object device and that is indicative of unsuccessful creation of a first transaction resource of the first transaction;

receiving, within the preset time, a response that is sent by the second managed object device and that is indicative of successful creation of a second transaction resource of the first transaction, wherein the response indicative of successful creation of the second transaction resource carries an identifier of the second transaction resource; and sending, based on the response indicative of unsuccessful creation of the first transaction resource of the first transaction and the response indicative of successful creation of the second transaction resource of the first transaction, a processing request for the second transaction resource of the first transaction to the second managed object device that sends the response indicative of successful creation of the second transaction resource, wherein the processing request for the second transaction resource of the first transaction carries the identifier of the second transaction resource.

12. The application server according to claim 11, wherein the instructions for sending comprise further instructions for:

determining that the response indicative of unsuccessful creation of the first transaction resource of the first transaction is a first failure response that does not carry an updated first execution time, and send a deletion request carrying the identifier of the second transaction resource to the second managed object device that sends the response indicative of successful creation of the second transaction resource; and sending a first transaction resource creation request carrying the updated first execution time to the first managed object device.

13. The application server according to claim 11, wherein the instructions for sending comprise further instructions for:

determining that the response indicative of unsuccessful creation of the first transaction resource of the first transaction is a second failure response carrying an updated first execution time, and sending an update request carrying the updated first execution time and the identifier of the second transaction resource to the second managed object device that sends the response indicative of successful creation of the second transaction resource; and sending a first transaction resource creation request carrying the updated first execution time to the first managed object device.

14. A managed object device in a machine to machine communications (M2M) system, the managed object device comprising:

a processor;

a memory storing a program to be executed in the processor, the program comprising instructions for:

receiving a first transaction resource creation request sent by an application server for a first transaction, wherein the first transaction resource creation request comprises an identifier of the first to-be-operated resource, a first execution time, and a first to-be-executed operation;

determining that a first transaction resource was not created according to the first transaction resource creation request; and sending a response indicative of unsuccessful creation of the first transaction resource of the first transaction to the application server.

15. The managed object device according to claim 14, wherein the instructions for successfully creating comprise further instructions for:

determining that a first transaction resource queue exists on the managed object device;

determining, according to the first execution time and a state of the first to-be-operated resource of the managed object device, that the first transaction resource does not meet a preset resource creation condition;

determining, according to the preset resource creation condition, to update the first execution time to a time later than an execution time of a transaction resource in the first transaction resource queue, wherein the first transaction resource queue comprises at least one transaction resource; and the instructions for sending further comprising instructions for sending a second failure response carrying the updated first execution time to the application server.

* * * * *